US008332457B2

(12) United States Patent
Brun et al.

(10) Patent No.: US 8,332,457 B2
(45) Date of Patent: Dec. 11, 2012

(54) TILE ARCHITECTURAL STYLE FOR PRIVACY-PRESERVED DISTRIBUTED COMPUTING

(75) Inventors: Yuriy Brun, Wilmington, DE (US); Nenad Medvidovic, Manhattan Beach, CA (US)

(73) Assignee: University of Southern California, Los Angeles, CA (US)

( * ) Notice: Subject to any disclaimer, the term of this patent is extended or adjusted under 35 U.S.C. 154(b) by 942 days.

(21) Appl. No.: 12/259,059

(22) Filed: Oct. 27, 2008

(65) Prior Publication Data
US 2009/0112784 A1 Apr. 30, 2009

Related U.S. Application Data

(60) Provisional application No. 60/982,617, filed on Oct. 25, 2007.

(51) Int. Cl.
*G06F 15/16* (2006.01)
(52) U.S. Cl. .......................................... 709/201; 706/46
(58) Field of Classification Search .................. 709/201; 706/46
See application file for complete search history.

(56) References Cited

U.S. PATENT DOCUMENTS

| 6,247,164 B1* | 6/2001 | Ashar et al. ................... 716/104 |
| 2007/0106963 A1* | 5/2007 | Baumgartner et al. ........... 716/2 |
| 2008/0021899 A1* | 1/2008 | Avidan et al. .................... 707/6 |
| 2009/0083390 A1* | 3/2009 | Abu-Ghazaleh et al. ..... 709/209 |

OTHER PUBLICATIONS deLorimier et al ("Algorithmic Self-Assembly of Circuits," Aug. 24, 2002; accessed <www.colorado.edu/cs/reishus/papers/deLorimier02.pdf>), whole document.*
Childs, A.M. Secure Assisted Quantum Computation. Quantum Information and Computation, 5(456), 2005. printed from the Internet: <URL:http://arxiv.org/PS_cache/quant-ph/pdf/0111/0111046v2.pdf.
Dean, J. et al. MapReduce: Simplified Data Processing on Large Clusters. In Symp. Operating System Design and Implementation, 2004. printed from the Internet: <URL:http://labs.google.com/papers/mapreduce-osdi04.pdf.
Garfinkel, S. Commodity grid computing with Amazon's S3 and EC2. UESNIX, pp. 7-13. Feb. 2007. printed from the Internet:<URL:http://www.usenix.org/publications/login/2007-02/openpdfs/garfinkel.pdf.
Korpela, E. et al. SETI@home—massively distributed computing for SETI. IEEE MultiMedia, 3(1):78-83, 1966. printed from the Internet: <URL:http://setiathome.berkeley.edu/sah_papers/CISE.pdf.

(Continued)

*Primary Examiner* — Thomas Dailey
(74) *Attorney, Agent, or Firm* — McDermott Will & Emery LLP

(57) ABSTRACT

A method and system for privacy-preserved distributed computing on large networks using a tile-based architecture is disclosed. An expression for a tile seed assembly characterizing a problem, such as an NP-complete problem, may be determined. The solution to the tile seed assembly is a full tile assembly including a plurality of tile types. In a network of participating nodes, a tile type may be assigned to each node. A description of a tile type specific to a node may be provided to each node. A tile seed assembly may be established on selected nodes. Through progressive recruitment and replication, the tile assembly may mature, in response to the problem being solvable, into a full tile assembly having a solution. The solution may be received by the client computer.

32 Claims, 16 Drawing Sheets

OTHER PUBLICATIONS

Larson, S.M. et al. Folding@Home and Genome@Home: Using distributed computing to tackle previously intractable problems in computational biology. Comp. Genomics, 2002. printed from the Internet:<URL:http://arxiv.org/ftp/arxiv/papers/0901/0901.0866.pdf.

The BOINC network. printed from the Internet:<URL:http://boinc.berkeley.edu.

Winfree, E. Simulations of Computing by Self-Assembly by DNAQ. Technical Report CS-TR:1998:22, Caltech, 1998. printed from the Internet:<URL:http://caltechcstr.library.caltech.edu/485/02/22.pdf.

Yao, A. C-C. How to generate and exchange secrets. In FOCS86, pp. 162-167, 1986. printed from the Internet:<URL:http://dx.doi.org/10.1109/SFCS.1986.25.

Brun. Solving NP-complete problems in the tile assembly model. ScienceDirect, Theoretical Computer Science 395 (2008), pp. 31-46.

Brun et al. Preserving privacy in distributed computation via self-assembly. Technical Report USC-CSSE-2008-819, Center for Software Engineering, University of Southern California, 2008.

Malek et al. A style-aware architectural middle-ware for resource-contrained, distributed systems. IEEE Transactions on Software Engineering, vol. 31, No. 3, Mar. 2005, pp. 256-272.

\* cited by examiner

TILE ARCHITECTURAL STYLE FOR PRIVACY-PRESERVED DISTRIBUTED COMPUTING

CROSS-REFERENCE TO RELATED APPLICATION(S)

This application is based upon and claims priority to U.S. Provisional Patent Application Ser. Nos. 60/982,617, entitled "Tile Architectural Style," filed Oct. 25, 2007, the entire content of which is incorporated herein by reference.

STATEMENT REGARDING FEDERALLY SPONSORED RESEARCH

This work was funded by Grant Nos. ITR-0312780 and 0323749, awarded by the National Science Foundation. The Government has certain rights in the invention.

BACKGROUND

1. Field

This application relates to distributed software systems.

2. Description of Related Art

Solving certain important computational problems currently requires an amount of time which grows exponentially with the size of that problem. As a result, single computers can practically solve only small instances of such problems. Large networks, such as the Internet, have the potential to solve larger instances significantly faster. The ability to solve such problems many times faster than a single computer has substantial academic, financial, and social implications and greatly impacts such fields as medicine, management, systems engineering, and others. For example, the ability to determine proteins' minimal-free-energy structure within days (as opposed to years) could lead to cures or treatments of cancers, HIV, and other life-threatening diseases. As another illustration, the ability to accurately predict the optimal allocation of resources to a project could dramatically cut costs of public and private projects. The $14 billion dollar "Big Dig" highway construction project of Boston, Mass., for example, would likely have benefited substantially from the availability of such predictions.

A problem faced by practitioners in the art is that designing a software system to distribute the computation over a large private or public network almost invariably means disclosing the input and algorithm to others. That is, the involved data does not remain private throughout the computation. For instance, several systems for distributing computation over a large network have been realized, such as Google's MapReduce and Amazon's EC2. Additionally, various large scale computing efforts for computationally-intensive problems over the Internet have been proposed or implemented. Examples include SETI@home and Folding@Home. The methods leading to the solutions of these problems disclosed inputs, algorithms, and outputs to the Internet nodes.

Many illustrative scenarios can be contemplated wherein the computing power of a large network may be highly desirable given the nature of a particular problem, but where failure of privacy will deter enterprises from developing systems to distribute the computation. One example of such a problem is an "NP complete" problem. NP complete is an important class of problems having the properties that (i) any solution to the problem can be verified quickly in polynomial time, and (ii) if the problem can be solved quickly, then so can every problem in NP. A main characteristic of these problems is that no quick solution to them is known and computation times may dramatically increase with the size of the problem. Important NP complete problems having significant practical applications need to be solved. Conventional techniques, however, have failed to provide for distributed systems to solve these and similar problems without compromising privacy issues.

In a first illustrative scenario depicting the privacy problem associated with existing approaches, a pharmaceutical company has generated a series of candidate proteins for treating a particular cancer. The company needs to predict the 3-D structure of the proteins as they would fold within the human body but the proteins' amino acid sequences are valuable intellectual property and must remain private. The protein folding problem is NP-complete, and thus for reasonably-sized proteins, it could take years on a single computer, or even on small private networks, to compute the desired structures. The company is unwilling to use existing approaches to distribute the computation on a public network because they distribute the amino acid sequences to all helping nodes.

A second illustrative scenario involves image recognition, which is at the heart of many advanced artificial intelligence and security tasks. Matching faces seen in a camera to a database of known criminals allows automated intruder detection and aids security at public locations such as airports and casinos. However, facial recognition and image matching problems are NP-complete and many people may enter the location of interest at once. Further, any employed solution must execute quickly to deliver results in real-time. In order to protect the identity and privacy of the innocent individuals entering the location, the system must either guarantee that the entire computation takes place on a large private network which is capable of preserving privacy. Traditional approaches do not provide for such a mechanism.

What is needed is an architecture for allowing the creation of privacy-preserving distributed software systems, where the data involved remains private during and after the computation.

BRIEF SUMMARY

A tile architectural system and method for privacy-preserved distributed computation over a large private or public network is disclosed. The tile architectural style may distribute computation over a network such that no small group of computers knows the algorithm or the input. The style may abstract away the distribution and automate the parallelization of computation, enabling the architect to write only non-parallel code. In embodiments, the style may be fault- and adversary-tolerant (malicious, faulty, and unstable nodes may not break the computation), and scalable (communication among the nodes does not increase with network or problem size).

In one aspect, an expression for a tile seed assembly characterizing a problem, such as an NP-complete problem, may be determined. A plurality of tile types may be associated with the tile seed assembly. The solution to the tile seed assembly may be a full tile assembly including a plurality of tile types. In a network of participating nodes, a tile type may be assigned to each node. A description of a tile type specific to a node may be provided to each node. A tile seed assembly may be established on selected nodes. Through progressive recruitment and replication, the tile assembly may mature, in response to the problem being solvable, into a full tile assembly having a solution. The solution may be received by the client computer.

A method for solving a problem by distributing the computation to the problem across a plurality of participating nodes in a network using a tile-style architecture may include determining an expression for a tile seed assembly for said computation, identifying a plurality of tile types, assigning at least one tile type to each node of said plurality of nodes, communicating, to each node, information comprising said at least one tile type assigned to said node, and establishing an executable instance of said tile seed assembly on selected nodes of said plurality of nodes.

The method may further include progressively recruiting tiles from other nodes from among said plurality of participating nodes until, in response to said problem being solvable, a completed tile assembly is thereby formed, wherein said progressively recruiting is initiated by one or more said selected nodes. The method may also include progressively replicating the tile seed assembly. The problem may include one of an NP-problem or an NP-complete problem.

A computer-program product for distributing a computation to a problem to be solved across a plurality of participating nodes in a network using a tile-style architecture may include a machine-readable medium including instructions executable by a processing system to identify a plurality of tile types, assign at least one tile type to each node, communicate, to each node, information comprising said at least one tile type assigned to said node, and establish an executable instance of a tile seed assembly on selected nodes of said plurality, said tile seed assembly comprising encoded inputs to said computation.

A method for solving a distributed problem characterized by a tile seed assembly using a tile style architecture, wherein said tile seed assembly is operative to grow into a full tile assembly in response to said problem being solvable, the method including receiving, by a first node from a second node in a network of nodes, information including an assignment by a client node of a tile type to at least said first node and a third node, and a description of said tile type, receiving, by said first node from said second node, a request to deploy a tile of said same tile type as an attachment of said tile seed assembly, deploying, by said first node, said tile, and sending, by said first node to a third node in said network of nodes, a request to deploy another tile of said same tile type.

A computer-program product for solving a distributed problem characterized by a tile seed assembly using a tile style architecture, wherein said tile seed assembly is operative to grow into a full tile assembly in response to said problem being solvable, including a machine-readable medium including instructions executable by a processing system to receive, by a first node from a second node in a network of nodes, information including an assignment by a client node of a tile type to at least said first node and a third node, and a description of said tile type, receive, by said first node from said second node, a request to deploy a tile of said same tile type as a tile in said tile seed assembly, deploy, by said first node, said tile; and send, by said first node to a third node in said network of nodes, a request to deploy another tile of said same tile type.

A system for solving a problem by distributing the computation to the problem across a plurality of participating nodes in a network using a tile-style architecture, including a computer system comprising a processing system configured to identify a plurality of tile types, assign at least one tile type to each said participating node, communicate, to at least one of said participating nodes for each identified tile type, information comprising said at least one tile type assigned to said node, establish, based on said assigned tile types, a tile seed assembly on selected nodes of said plurality, said tile seed assembly comprising encoded inputs to said computation, and a plurality of computing machines located respectively at each of said plurality of participating nodes, each computing machine comprising a processing system configured to receive said assigned at least one tile type and a description of said tile type, receive a request to deploy a tile of said assigned tile type, deploy said tile, and send to other participating nodes a request to deploy another tile of said same tile type.

These, as well as other objects, components, steps, features, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

In an aspect, a tile architectural system and method allows distributing complex computationally intensive problems on large public networks while preserving the privacy of the algorithm and data. In other aspects, the system and method allow scaling well to leverage the size of the public network to accelerate the computation, as well as tolerating faulty or malicious nodes. A further discussion of the tile assembly model and its background may be found in the publications entitled "Preserving Privacy in Distributed Computation via Self-Assembly", dated Sep. 8, 2008, Technical Report USC-CSSE-2008-819, Center for Software Engineering, University of Southern California available at the URL http://cs-se.usc.edu/csse/TECHRPTS/2008/usc-csse-2008-819/usc-csse-2008-819.pdf and authored by the inventors, which is incorporated by reference as if fully set forth herein.

In an aspect, a biologically-inspired tile style decomposes a computational-problem algorithm into basic operations and assigns individual nodes on a network to deploy objects representing each of the input and intermediary data bits. The objects may then communicate over the network to compute the results while preserving privacy of the overall input and algorithm.

Privacy can be said to be preserved in a distributed network of nodes of computers if, with high probability, for all time, for all nodes in the on the network, each node can determine neither the algorithm the network is executing nor the entire input to the algorithm.

In another aspect, the underlying problem comprises an NP-complete problem, which may have a large (exponential in the size of the input) number of independent threads. Using the tile style, many non-blocking computations may be executed in parallel, thus ensuring that no node ever waits for network communication. This property allows tile-style systems to leverage network size to enhance the speed of the computation. The high distribution of data yields preservation of privacy. In yet another aspect, redundancy techniques directly aid fault- and adversary-tolerance.

Tile style systems preserve the privacy of the data used in the computation as long as no adversary controls more one than half of the public network. Tile-style systems are fault- and adversary-tolerant.

Figure 11:
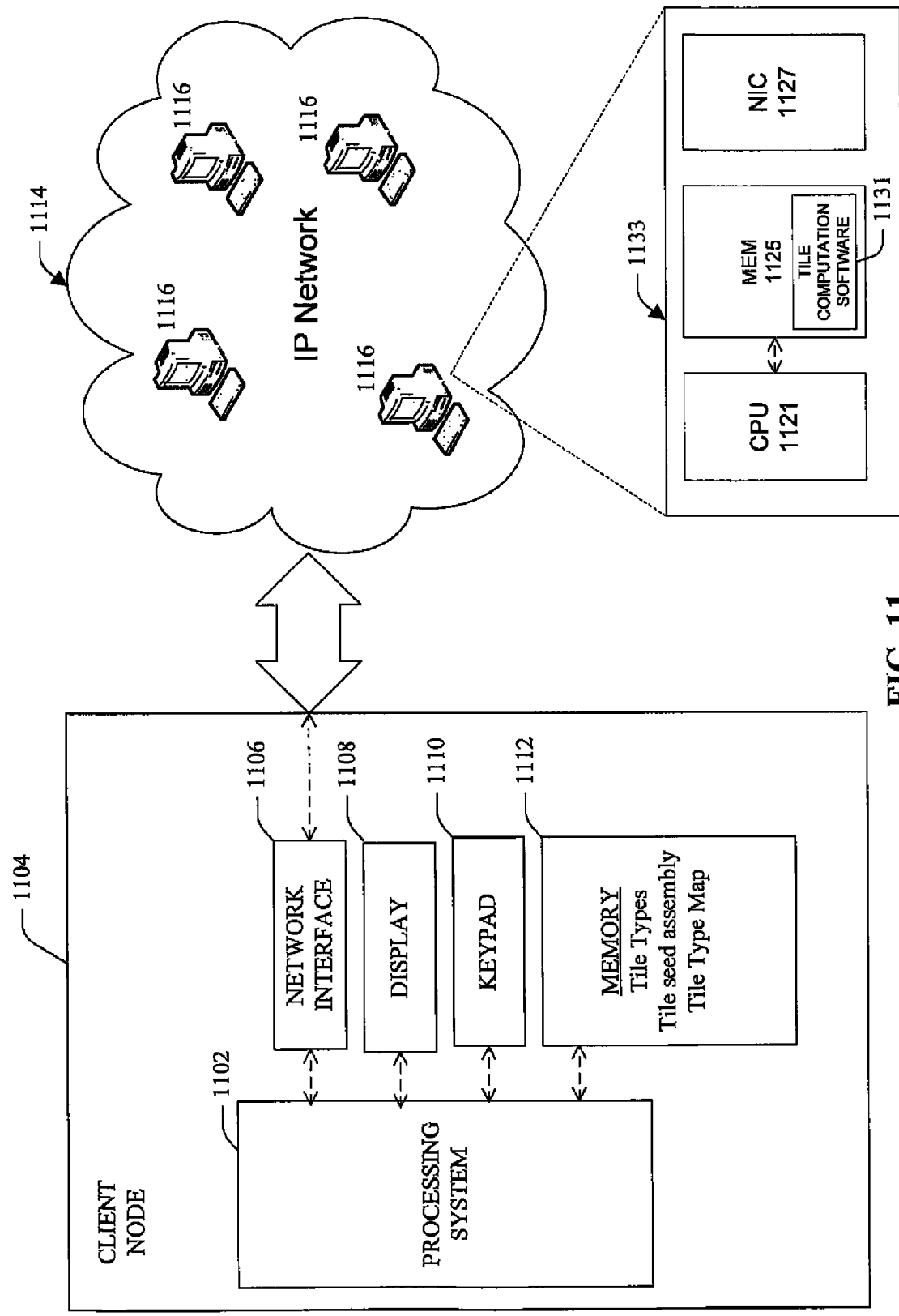
FIG. 11 illustrates a block diagram of a client node and a distributed IP network of participating nodes for computing a tile-style solution.

As shown in FIG. 11, a system according to some aspects may include a client node 1104 which includes a computing system which may be one or more actual physical computing machines. Client node 1104 includes a processing system 1102, memory 112, keypad 110 and network interface functionality 1106. The processing system 1102 and memory 1112 may run executable routines at the client node. In one embodiment, JAVA is used as the programming language, although virtually any known language may be used. Included in memory 1112 are not both the executable routines and the data used in the tile style architecture, including a plurality of tile types, information including one or more tile seed assemblies, and a tile type map which may preexist or which may be configured on the fly, depending on the embodiment.

Also shown is a distributed IP network 1114 within which are included participating nodes 1116. Participating nodes 1116 are those nodes on the network which are operative to participate in recruiting tiles for tile assemblies (discussed below) in response to an instance of a tile seed assembly being established on the network by client node 1104. In an aspect, client node 1104 is responsible for originating the problem to be solved in the form of a tile seed assembly, and for distributing a first executable instance of the tile seed assembly. Client node 1104 also may receive the output or solution to the solved problem. In general, the entity in control of client node 1104 knows the details behind the problem and sets up the problem. The participating nodes 1116 and the rest of IP network 1114 do not know the algorithm or the entire input to the algorithm.

In an aspect, each participating node includes at least one computing machine 1133 which includes a CPU 1121, memory 1125, and a network interface card 1127 (or other network interface function). Each computing machine may run tile computation software 1131. The tile computation software 1131 may be a software program that runs on CPU 1121 of computing machine 1133. In an aspect, a function of tile computation software is to (i) enable the participating node running the software to communicate with other participating nodes and the client node, and (ii) establish the functionality for the participating node to perform the necessary computations with the tiles as described below (such as discovery, replication, recruitment, encoding of domains, and the like. The software 1131 may have additional or alternative functions. Such additional functions may include client authentication, encryption, etc.

The tile computation software 1131 may be in any known computer programming language. In one embodiment, JAVA is used. The tile computation software 1131 may, in an embodiment, be provided by client node 1104 in the form of a download via a website or ftp link. Alternatively, it may be available and distributed in the form of a disk or through other means.

Computing with Tiles

The tile assembly model is a formal model of molecular self-assembly that describes how simple molecules can form complex crystals. In this model, molecules are square tiles with special labels on their four sides. Tiles may stick together under certain conditions when their abutting sides' labels match. This process allows molecules to compute functions.

The tile assembly model has tiles, or squares, that stick or do not stick together based on various binding domains on their four sides. Each tile has a binding domain on its north, east, south, and west side, and each distinct binding domain has an integer strength associated with it. The four binding domains, elements of a finite alphabet, define the type of the tile. The placement of a set of tiles on a 2-D grid is called a crystal; a tile may attach in empty positions on the crystal if the total strength of all the binding domains on that tile that match its neighbors exceeds the current temperature. Starting from a seed crystal, tiles may attach to form new crystals. Sometimes, several tiles may satisfy the conditions necessary to attach at a position, in which case the attachment is non-deterministic. A tile assembly S computes a function f: $N^n \rightarrow N^m$ if there exists a mapping i from $N^n$ to crystals and a mapping o from crystals to $N^m$ such that for all inputs $\vec{\alpha} \in N^n$, $i(\vec{\alpha})$ is a seed crystal such that S attaches tiles to produce a terminal crystal F and $o(F) = f(\vec{\alpha})$. In other words, if there exists a way to encode inputs as crystals, the system must attach tiles to produce crystals that encode the output. For those systems that allow nondeterministic attachments, the terminal crystal F that encodes the output must contain a special identifier tile.

Figure 1A:
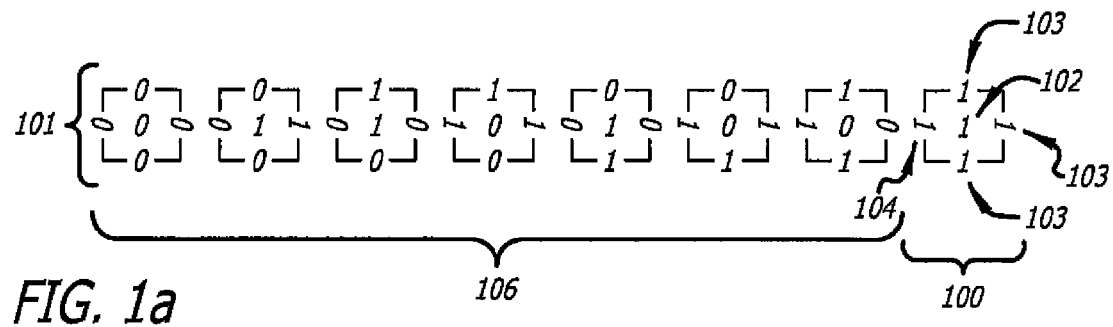
FIG. 1 illustrates an example of a tile assembly for adding numbers.
Figure 1B:
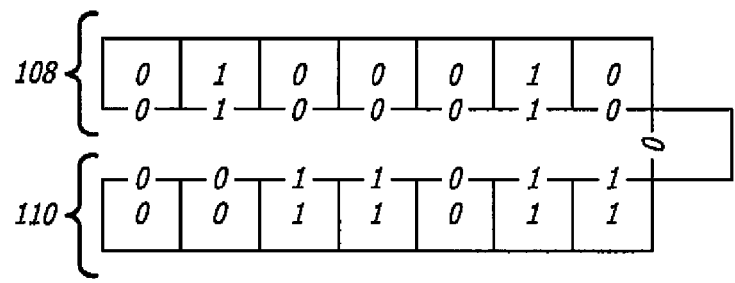
Figure 1C:
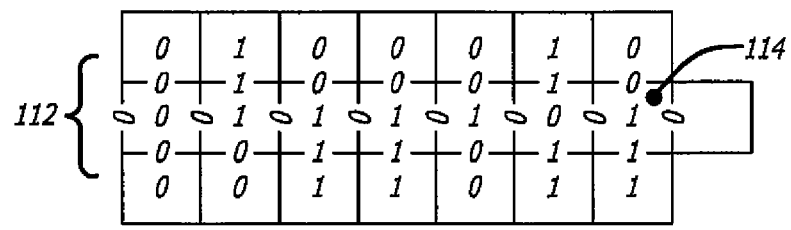
Figures 1, 5:
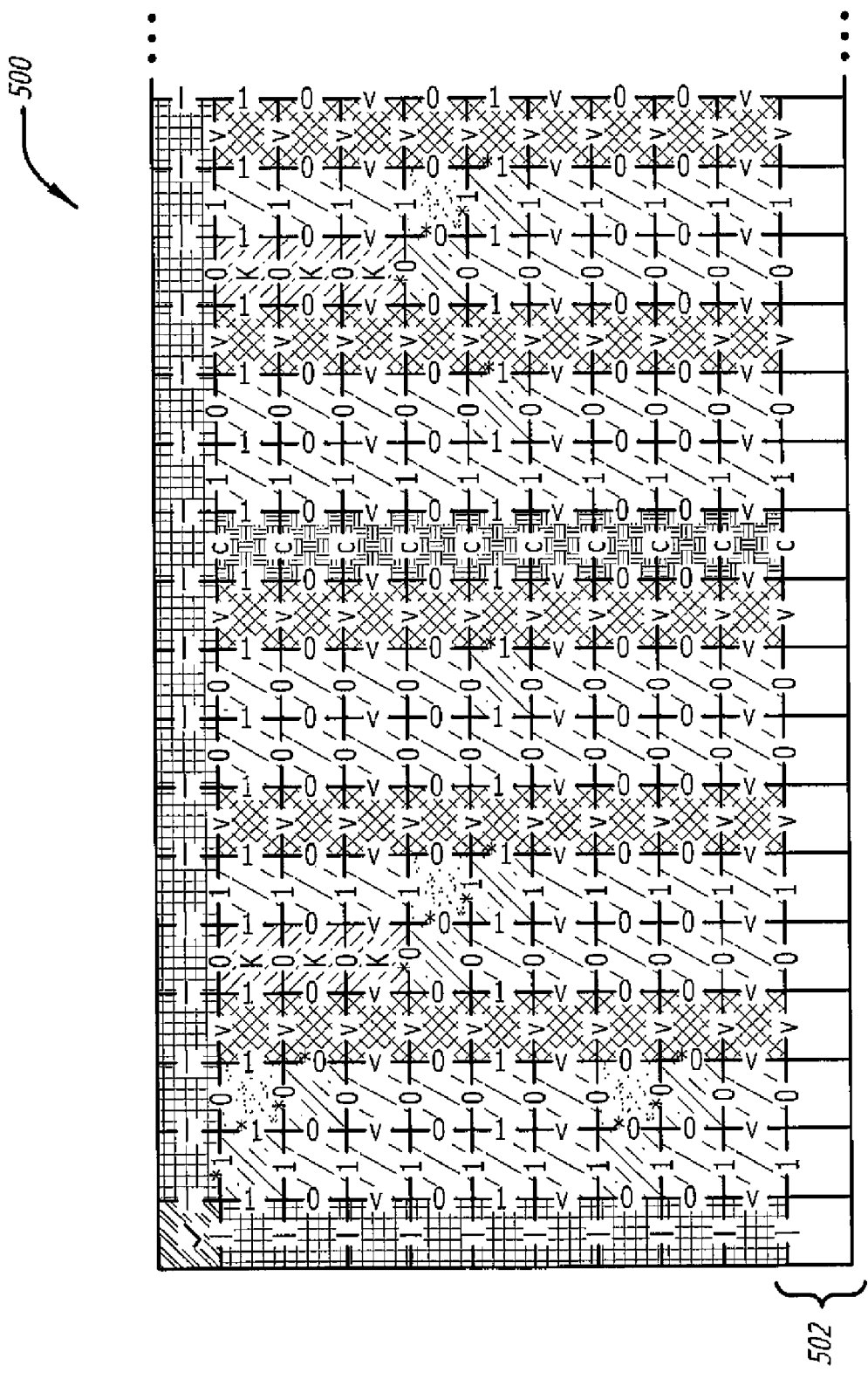
FIG. 5 illustrates an exemplary execution crystal of the tile assembly that solves SubSetSum.

The architectural style may decompose a computational-problem algorithm into basic operations. FIG. 1 shows a sample tile assembly that adds numbers. As shown in FIG. 1(a), the assembly uses a set 101 of eight computational tile types corresponding to eight blocks. Each block has five numbers. Referring to rightmost block 100 as an illustration, center number 1 (designated by 102) represents the binary sum of the three numbers 1 (designated by 103) on the north, east and south borders of the block. The number 1 on the west side (designated by 104) represents the carry byte of the addition binary operation. The remaining seven blocks 106 in this example are structured accordingly. FIG. 1(b) illustrates a seed configuration which encodes the inputs '34' (designated by 108 and represented by binary number 0100010) and '27' (designated by 110 and represented by binary number 0011011). FIG. 1(c) shows the attachment of computational tile set 112 to the seed to form the output 61=011101 (binary). In this example, tile 114 (found among the set 101 in FIG. 1(a)) can attach to the rightmost position as shown because of the matching sides. The remaining tiles can attach in a similar manner.

As noted above, the nature of NP-complete problems is that if one can solve one such problem quickly, then one can solve all such problems quickly. For example, if one finds a polynomial time algorithm to solve SubsetSum, one can then solve the traveling salesman, 3-SAT, and all other NP problems in polynomial time. Thus, it is sufficient to design a system that uses a large distributed network to discreetly solve one NP-complete problem, e.g., SubsetSum.

Figures 2, 5:
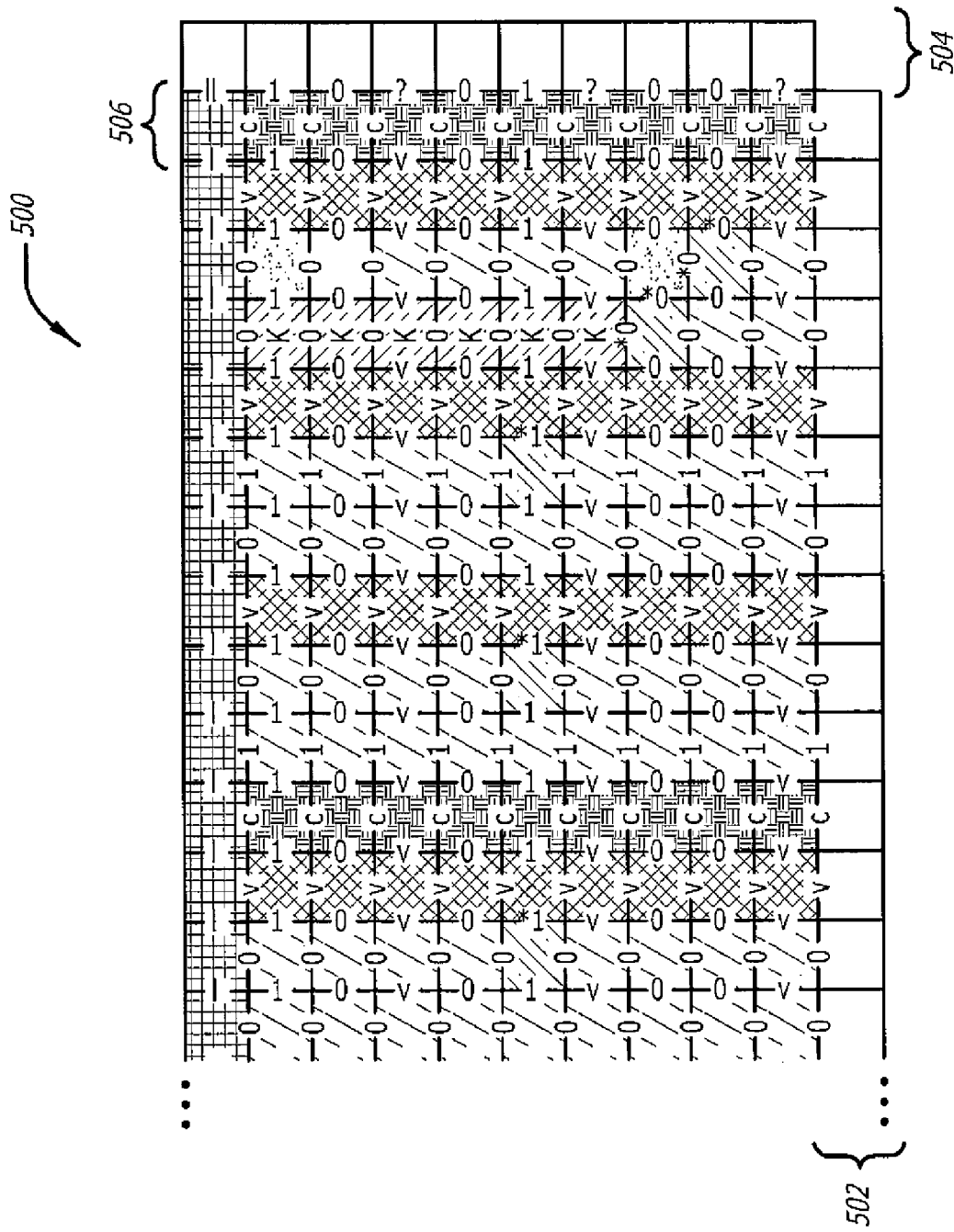

FIG. 2 shows an example of a tile assembly that solves an instance of SubsetSum quickly and using a comparatively small set of tile types. SubsetSum is a well-known NP-complete problem. The problem involves determining whether the sum of a subset of numbers adds up to a given target number. The input to the problem is a set of natural numbers and a natural target number. The output is 1 if the sum of some subset of those numbers is equal to the target number, and 0 otherwise.

Figure 2A:
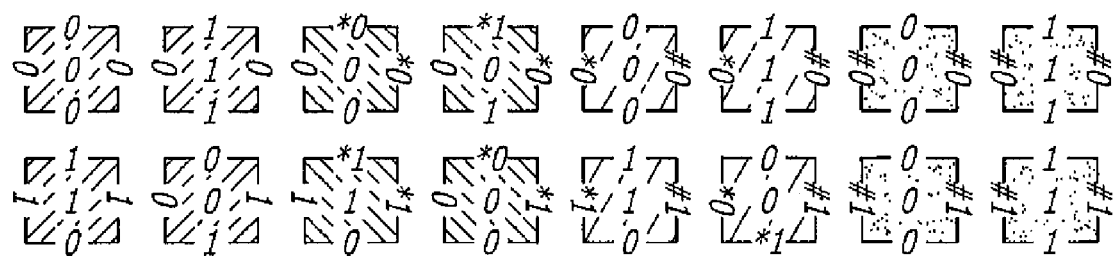
FIG. 2 illustrates an example of a tile assembly for solving a SubsetSum problem for determining whether the sum of a subset of a set of numbers adds up to a given target number.
Figure 2B:
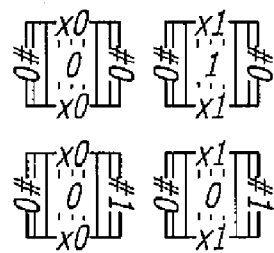
Figure 2C:
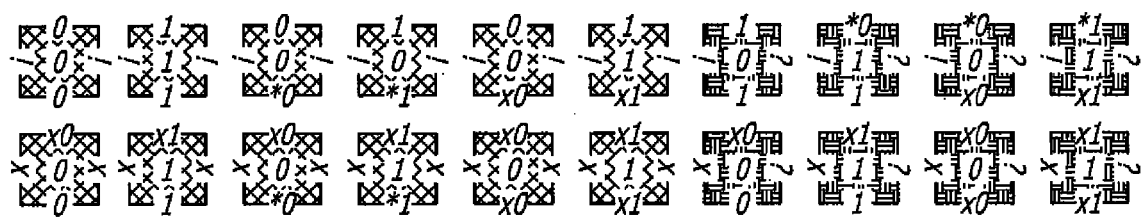
Figure 2D:
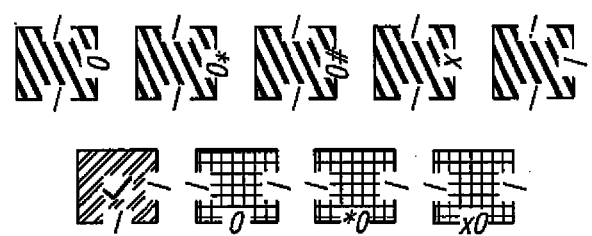

The SubsetSum tile system is really a combination of four tile systems, designed to work together. FIG. 2(a) shows the tiles of an assembly that subtracts numbers. FIG. 2(b) shows the tiles of an assembly that copies the information upward. FIG. 2(c) shows the tiles of an assembly that non-deterministically picks whether or not to subtract the next number. FIG. 2(d) shows the tiles of a system that verifies that the subtractions completed correctly and that the final result equals zero, respectively. Further background on tile systems including SubsetSum tile systems may be found in the article "Solving NP-complete problems in the tile assembly model" by Yuriy Brun, ScienceDirect, Theoretical Computer Science 395 (2008) 31-46, at URL http://csse.usc.edu/~ybrun/pubs/pubs/Brun08np-c.pdf, which is incorporated herein by reference as if fully set forth herein.

The tiles communicate via their side interfaces. Some interfaces contain a 0 or a 1, communicating a single bit to their neighbors. Other interfaces include special symbols such a # and ! indicating in this example that no subtraction is happening at this place, * and ! meaning that subtractions should take place, or ? meaning that the given tile attaches non-deterministically (e.g., more than one tile can attach). The system may non-deterministically select a subset of the input numbers to subtract from the target number, and if the result equals 0, attach a special ✓ tile.

The shading in different tiles of FIG. 2 and later figures represents different functions performed by those tiles. The shading is for the convenience of the programmer in the interpretation of the tile assemblies, and is not needed as part of the programming of the tiles because the tile type of each tile is defined in this embodiment by its four sides.

Figure 3:
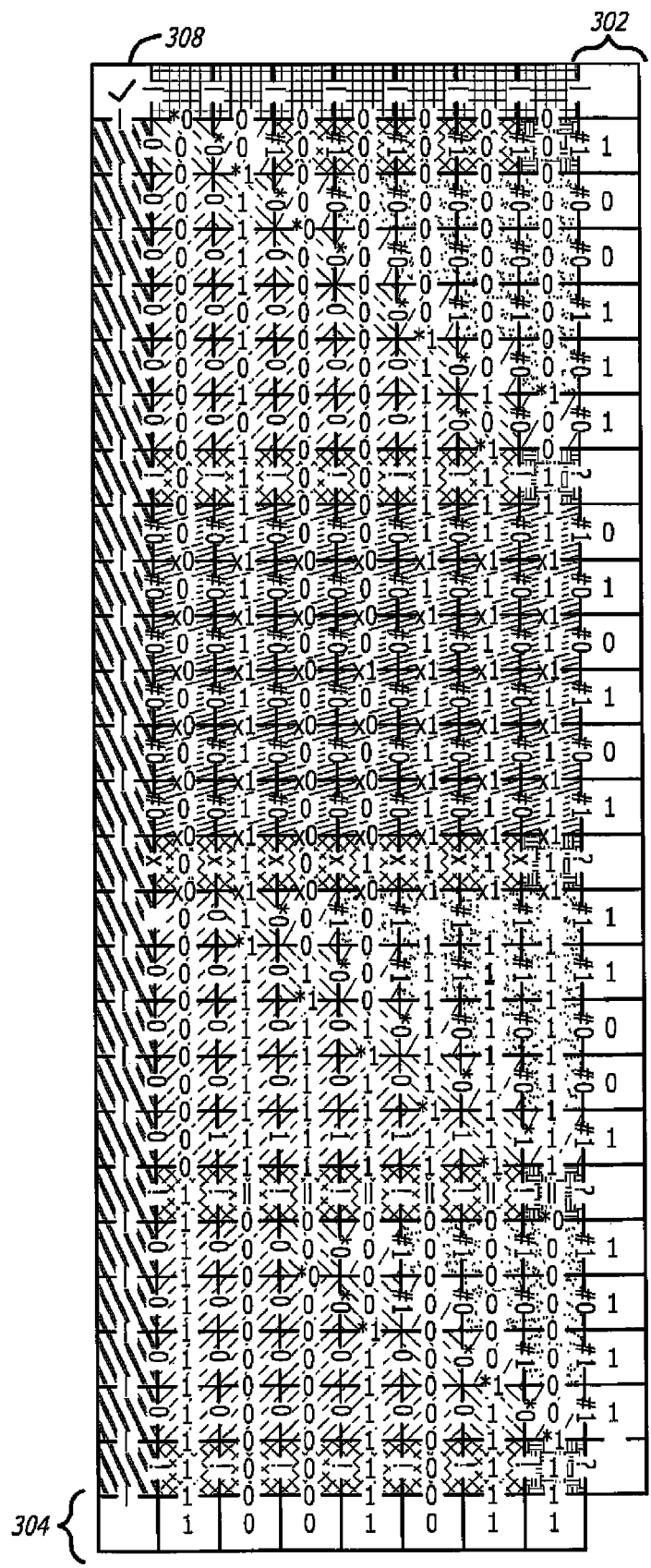
FIG. 3 illustrates an exemplary execution crystal of the tile assembly that solves SubsetSum.

FIG. 3 shows a sample execution of a full tile assembly that solves the problem SubsetSum. The tile seed assembly is shown by the clear (non-shaded) rows 304 and 302 of tiles across the bottom and right of the full tile assembly. The tile assembly includes a number of tiles of varying tile types. A tile type in this embodiment is defined by the four components of a tile (north, south, east, west). The tiles in the seed may, as here, contain less than four (e.g., one or two) components. The other components may be considered to have values of "null" for purposes of determining tile type. The example asks the question whether or not the sum of some subset of the set 111, 25, 37, 391 equals 75. Because 75=11+25+39, one nondeterministic execution of the tile system finds the proper selection of numbers and attaches the special ✓ tile 308. If there were no subset of numbers whose sum equaled 75, no such tile could attach.

Figure 4:
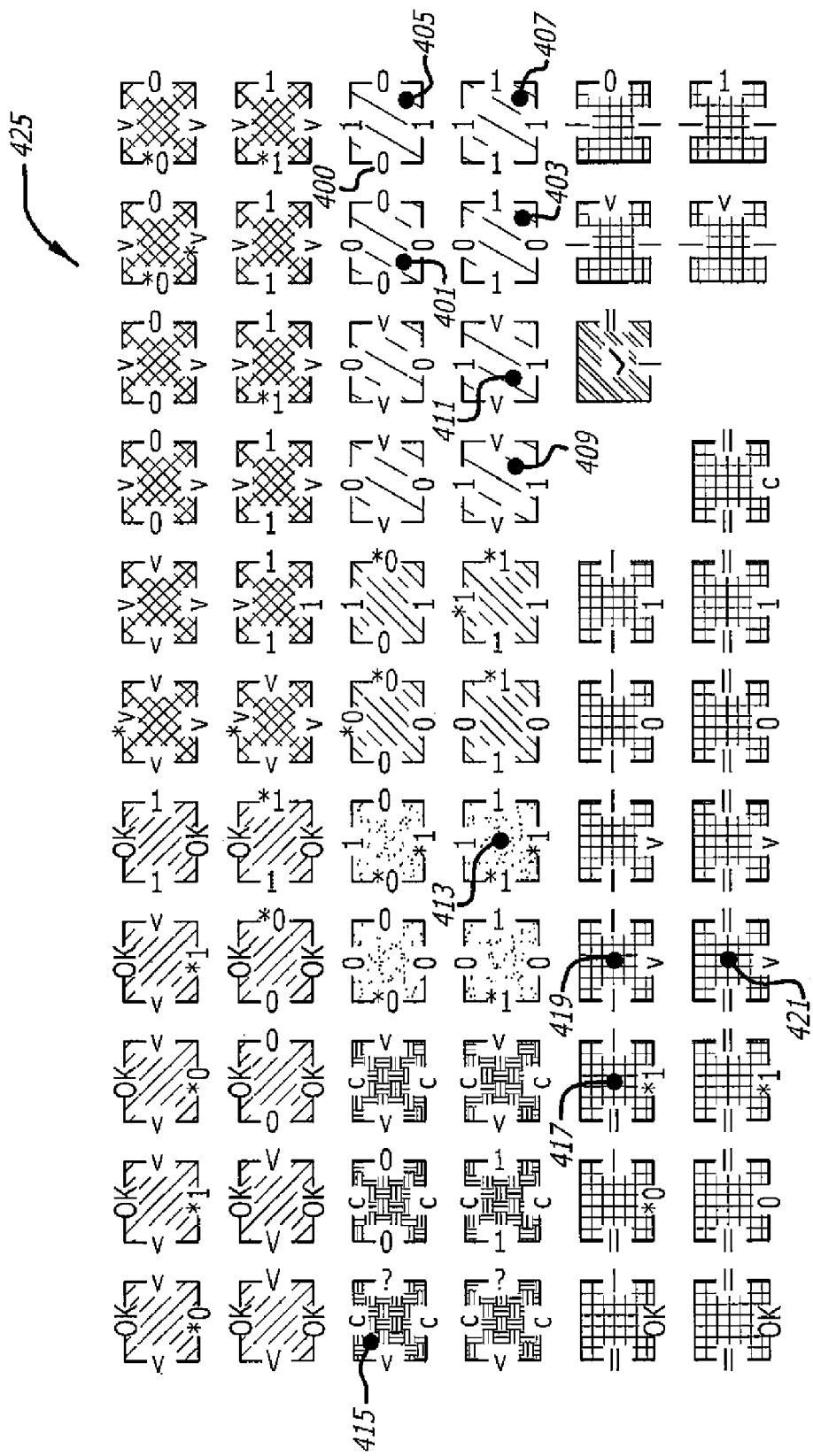
FIG. 4 illustrates an example of a tile assembly that solves a 3-SAT problem for determining whether a Boolean formula in conjunctive normal form is satisfiable by a truth assignment.

While the solution to SubsetSum above is sufficient to show that all NP-complete problems can be solved quickly, a tile assembly for 3-SAT is also presented as a further example. FIG. 4 shows an example of a tile assembly 425 that solves an instance of 3-SAT. 3-SAT is another well-known NP-complete problem. The problem involves determining whether a Boolean formula in conjunctive normal form (3-CNF) is satisfiable by a truth assignment. The input to the problem is the Boolean formula and the output is 1 if the formula is satisfiable and 0 otherwise.

The tiles communicate via their side interfaces. Some blocks (e.g., blocks 405 and 407) have interfaces containing a 0 (400) or a 1 (402) that communicate a single bit to their neighbors 401 and 403. Other interfaces include special symbols such as v and ¬ v (e.g., blocks 409 and 411, respectively) indicating that a variable is being addressed, * (e.g., block 413) meaning that a comparison should take place, ? (e.g., block 415) meaning the given tile attaches non-deterministically, and I and II (e.g., blocks 417, 419, 421) indicating the correctness of the computation up to that point. The assembly non-deterministically selects a variable truth assignment and checks if that assignment satisfies the formula. If and only if it does, a special ✓ tile attaches to the assembly as described below.

FIG. 5 shows a sample crystal of a tile assembly 500 that solves SubSetSum. The example asks the question whether or not $\phi=(x_2 \vee \neg x_1 \vee \neg x_0) \wedge (\neg x_2 \vee \neg x_1 \vee \neg x_0) \wedge (\neg x_2 \vee x_1 \vee x_0)$ is satisfiable. This $\phi$ is encoded along the bottom row 502 of the crystal. The crystal corresponds to the truth assignment $\langle x_0, x_1, x_2 \rangle = \langle \text{TRUE}, \text{FALSE}, \text{TRUE} \rangle$. The variables $x_0$, $x_1$, $x_2$ are encoded along the rightmost column of the crystal. Together, the bottom row 502 and rightmost column 504 form the seed of the computation, and the remaining tiles self-assemble to non-deterministically select a truth assignment (in the second from the right column 506) and check whether that assignment satisfies $\phi$. Because this truth assignment satisfies $\phi$, the ✓ tile attaches in the northwest corner (FIGS. 5-1). If no truth assignment satisfied $\phi$, no such tile could attach.

Tile Architectural Style

Figure 6:
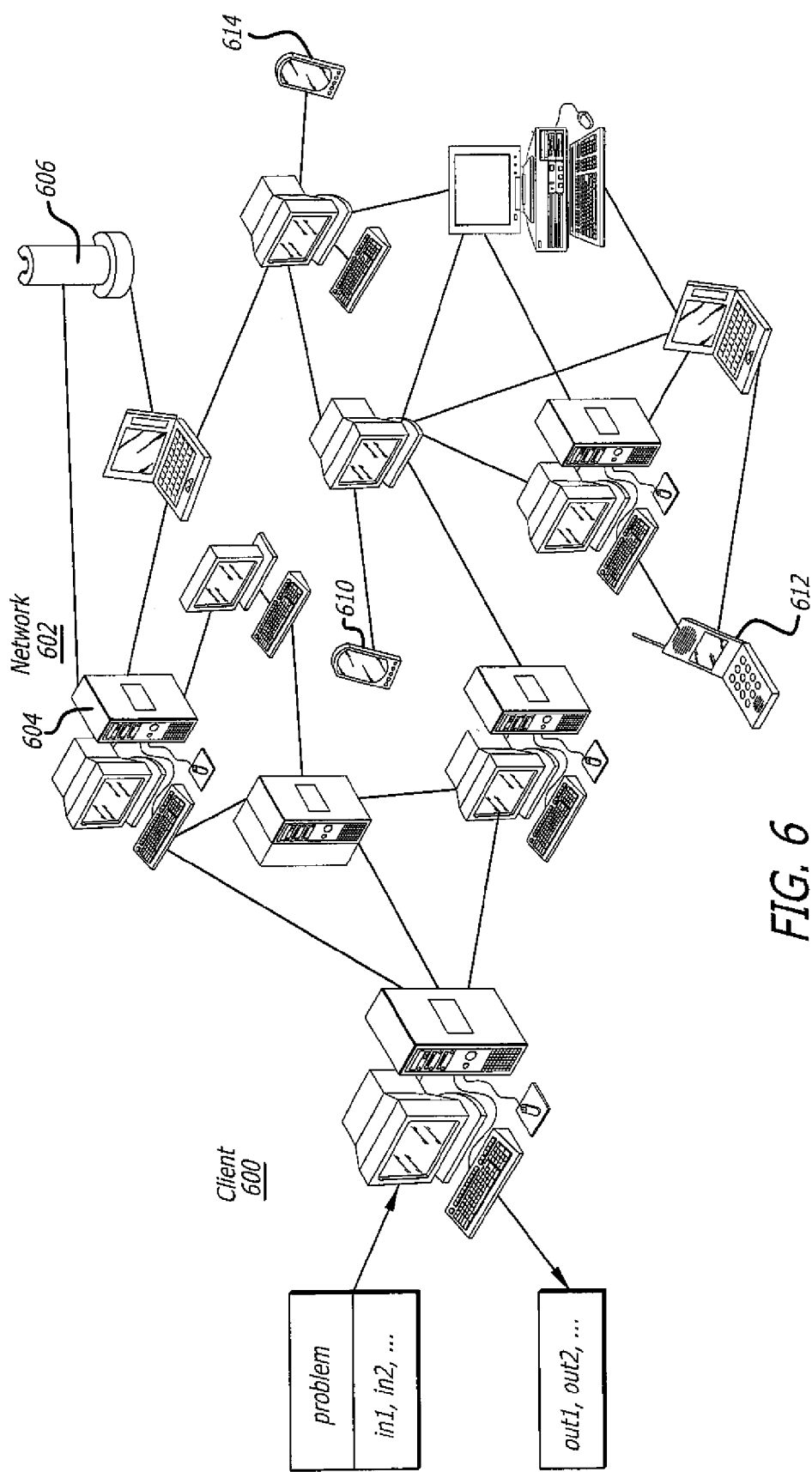
FIG. 6 illustrates a conceptual diagram of an exemplary system implementing a tile-style architecture.

For each computable function, a tile assembly may be created to compute that function. A tile-style architecture is based on a tile assembly refined by a client user into software components and composed according to the style rules described below. FIG. 6 shows a conceptual diagram of the interaction between the client's 600 computer and a network 602 of nodes. The network 602 may contain any of a wide variety of computing devices, such as a personal computer 604, server computer 606, personal digital assistant 610, mobile phone 612, various handheld devices 614, and the like. Each node may comprise one or more separate computing systems. In some configurations, the client 600 may comprise more than one computing system. Examples of network

602 may include a large public or private network, or the Internet. The inputs to the problem in1, in2, etc., are inserted in a form described below into the client 600 and distributed on the network (602) to obtain a solution in the form of outputs out1, out2, etc.

While a custom tile assembly may be created to solve a particular NP problem, in an embodiment, all NP problems may be translated to 3-SAT SubsetSum, or another problem with a known tile solution. Thus a user who wishes to solve a particular problem using the tile style needs to neither understand the tile assembly model nor program with tiles. The user may perform the translation and use the corresponding solution to guide the tile-style architecture. In addition to ease of use, this embodiment masks the problem the user is solving. Even if an adversary were to control an overwhelming portion of the public network and compromise the tile-style computation, that adversary could learn that the system is solving 3-SAT, but not the original problem.

The components of the tile-style architecture are instantiations of the tile types of the underlying assembly. While a system based on such an architecture may have a large number of components, there is a comparatively smaller number of different types of components (e.g., 64 types for solving 3-SAT). Nodes on the network may contain these components, and components that are adjacent in a crystal may recruit other components to attach, by sampling nodes until they find one whose side labels, or interfaces, match. Many tile components may run on a single physical node, as described further below.

In addition to defining the tile types, a tile assembly may also direct the architecture how to encode the input to the computation. The input may comprise a seed crystal, such as the clear tiles along the right edge 504 and bottom edge 502 in FIG. 5.

Figure 7:
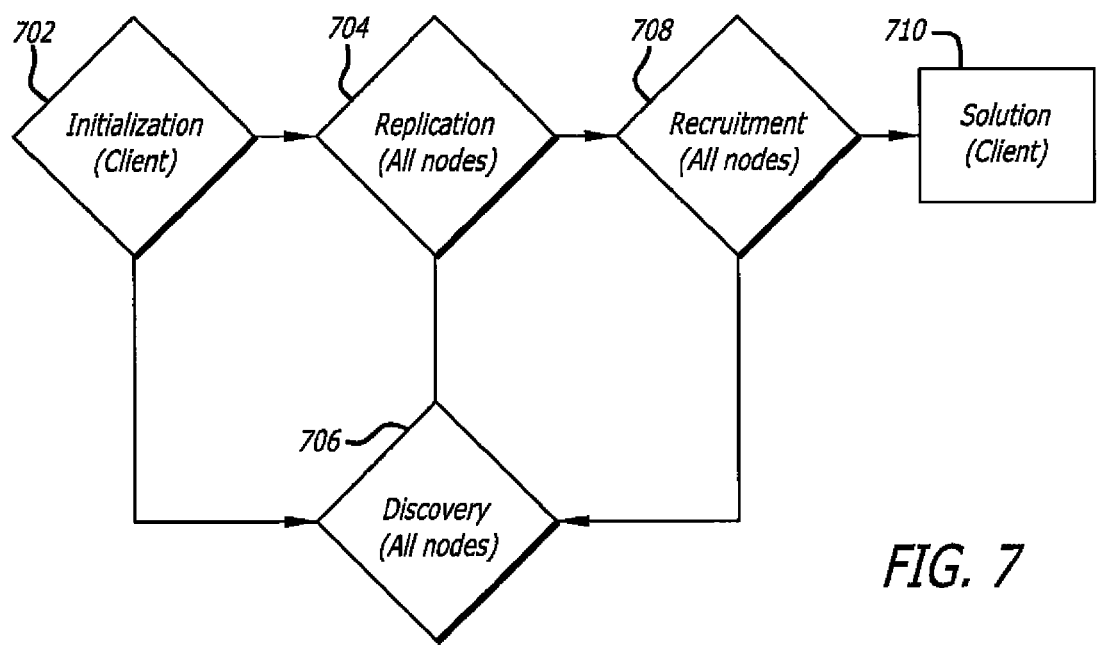
FIG. 7 illustrates a flow diagram of an exemplary overview of tile style node operations.

FIG. 7 shows a flow diagram summarizing exemplary steps taken by a tile-style system to find a solution. Initialization (702) may be performed at the client node 702. During initialization 702, the system may set up a single seed crystal on the network that encodes the input. The seed may then replicate on all participating nodes (704) to create many copies. Each of the copies may recruit tiles on the nodes (706) to assemble larger crystals and eventually produce the solution. The solution tile components (710) (e.g., the ✓ component for the 3-SAT assembly) may then report their state to the user. In an aspect, the nodes perform these operations autonomously, through discovery (708) without central control, in essence self-assembling the computation. These operations are described below.

702. Initializing Computation

In step 702, the client node may initialize the computation by performing three actions: creating the tile type map, distributing the map and tile type descriptions, and setting up a seed crystal.

1. Creating the Tile Type Map

A tile type map is a mapping from a large set of numbers (e.g., all 128-bit IP addresses) to tile types. In an aspect, the mapping determines the type of tile components that a computer with a given IP address (or other unique identifier that is harder for a potential adversary to control in bulk) may deploy. Various mapping configurations are possible. In one embodiment, the tile type map breaks up the set of numbers into k roughly equal-sized regions, where k is the number of types of tiles in the tile assembly. With reference to the 3-SAT example of FIGS. 4 and 5, there are 64 different tile types, so the tile type map divides the set of all 128-bit numbers into 64 regions of size $2^{122}$. The size of the tile type map, which may later be sent to all the nodes on the network, is comparatively small. For an assembly with k tile types in this embodiment, the map is k 128-bit numbers.

It is initially assumed that every node on the network is connected to p other nodes, distributed roughly randomly. On such a distributed network, no single node may know a large portion of the network. This is a first-order approximation of the Internet, but the disclosure herein also extends to higher order models. Every computer may contact its neighbors directly and may query its neighbors for their lists of neighbors.

2. Distributing the Map and Tile Descriptions

The client node may distribute the tile type map and a short description of one tile type to a node that deploys that tile type, as determined by the tile type map. A tile type's description may comprise the four tile component interfaces, which may in one embodiment be described using just a few bits. The client node may contact at least one node that deploys each tile type by contacting its neighbors, then their neighbors, and so on, until at least one node of each type knows the tile type map and its tile type description. For a system with k tile types, it will take, with high probability, less than 2 k log k time to "collect" a node of each type.

In an embodiment, the nodes that learn their types from the client node may propagate the information to their neighbors whose IP addresses map to the same tile types, and so on, until every computer on the network learns the type of tile component that computer will deploy. Thus every computer may receive the tile type map and the description of its own tile type. Each computer may in some instances, receive its tile type information and the tile type map several times, up to as many times as it has neighbors, which may equal p. Each node sends only θ(p) data because roughly 1/k of a node's p neighbors will have to be sent the 128 k bits, and $$\left(\frac{128kp}{k} = \Theta(p)\right).$$

Because the diameter of a network of N nodes with randomly distributed connections is θ(log N), the tile type map and the tile types according to this embodiment will propagate through the network in θ(log N) time.

In another embodiment involving a smaller network having fewer nodes than the number of types of tiles, multiple virtual nodes may be created on each machine an processed as in FIG. 7.

3. Setting up a Seed Crystal

In an aspect, the client node 600 is responsible for creating the first seed on the network 602 by establishing at least one executable instance of a tile seed assembly on the network. As an illustration of an embodiment of this procedure, for each tile in the seed crystal described by the underlying tile assembly, the client may select a node that deploys that tile type as described above, and ask that node to deploy a tile. The process of asking a target node to deploy a tile may include sending a packet request over the network to the target node to establish and maintain a record for a new tile of the target node's tile type, and to send a confirmation that the tile has been deployed. The target node may, in turn, generate a tile number and may send a packet-based confirmation request back to the client node with the tile number. The client may then inform each deployed tile component who its neighbors on the network are. The information regarding the identity of neighbors may, in other embodiments, be communicated along with the request to deploy a tile. Establishing a seed crystal may be performed by an executable program stored in a memory and run at a processing system at the client node.

A tile number may be used because often times a node will be deploying more than one tile. Thus, if another node needs to refer to a tile at the target node, it may thereupon send a message to the target node's IP address with the correct tile number. This process may also occur in recruitment (discussed below), where one node recruits another node of the same tile type to deploy a tile. If, after a predetermined period of time the client node does not receive the requested confirmation, the client node will proceed to issue the request to another target node. The tile seed assembly, once formed on the network, is an executable instance because it may now may mature into a bigger assembly through actions of the participating nodes executing their programming routines. The growing assembly may, if solvable, mature into a full assembly and return a solution to the client node.

Figure 12:
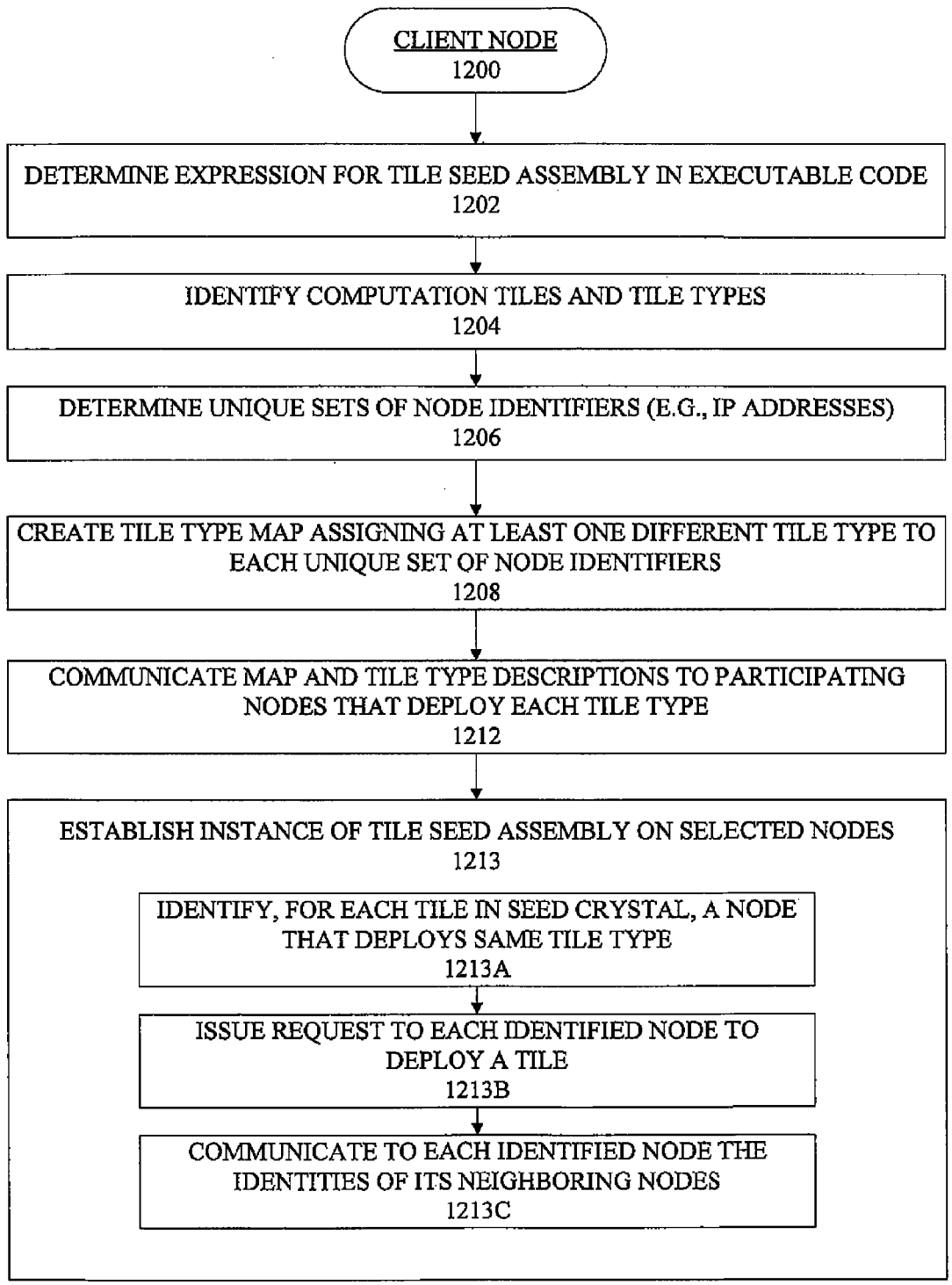
FIG. 12 illustrates a flowchart of an exemplary operation of a client node initiating the tile style on a network.

FIG. 12 illustrates a flowchart of an exemplary operation of a client node 1200 initiating the tile style on a network. An expression in executable code is determined (1202) for the applicable seed assembly, which describes the encoded inputs to the problem (e.g., 3SAT problem) using the underlying computer programming technique (e.g. JAVA, C++, etc.). At the same time, the computation tiles and different tile types needed for the computation are identified (1204). A unique set of node identifiers, such as IP addresses in the case of an IP network or the Internet, is determined (1206). For IP addresses, this is a 128 bit number. A tile type map is created wherein at least one different tile type is assigned to each unique set of node identifiers (1208) as described above. In the preferred embodiment, a single tile type is assigned to a single set of node identifiers.

The client node then initiates the process of distributing the tile type map and a description of each node's tile type to each participating node by communicating the tile type map and the description to at least one node that deploys each tile type (1212), such that at least one node of each tile type receives the map and a description of its tile type. (The maps and descriptions are then progressively distributed to the remaining participating nodes).

The client node then establishes at least one instance of a tile seed assembly on selected nods (1213). Selected nodes include at least one node of each different tile type. Establishing the instance may include, in an embodiment, identifying, for each tile in the seed crystal, a node that deploys the same tile type (1213A), issuing a request to each identified node to deploy a tile (1213B), and communicating to each identified node the identities of its neighboring nodes (1213C).

Figure 13A:
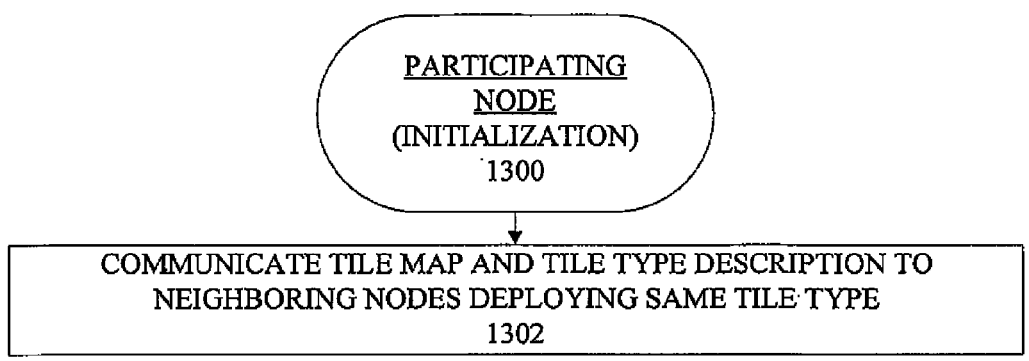
FIG. 13A illustrates a flowchart of an exemplary operation of a participating node initiating the tile style on a network.

FIG. 13A illustrates a flowchart of an exemplary operation of a participating node 1300 initiating the tile style on a network. In 1302, participating nodes that received the tile type map and tile type description from the client node (step 1212 in FIG. 12) communicate the tile map and the tile type description to neighboring node whose IP addresses map to the same tile type. Step 1302 may also be performed by the participating nodes receiving the map and description from the neighboring participating nodes, and so on, until all participating nodes learn the type of tile component that each computer will deploy.

708. Discovery

In an aspect, initialization, replication, and recruitment may all use the discovery operation 708. The discovery operation, given a tile type, may return a uniformly-random IP address of some computer or node deploying tile components of that type, meaning that if a node performs this operation repeatedly, the frequencies of the IP addresses it returns asymptotically approach the uniform distribution. Thus, every suitable node has an equal chance of being returned, in the long run. The uniform-randomness provided by the disclosed algorithm for discovery means that all participating nodes on the may perform a substantially similar amount of computation. The algorithm may use a property of random walks to ensure uniform-randomness.

In one embodiment, in order to quickly return the IP address of a computer that deploys tile components of a certain type, each node may keep a table, called the node table, of three IP addresses for each component type. For 3-SAT, the size of this table may be 64×3=192 IP addresses. The table contains only an identifier for each tile type, and not the details about the side labels. The preprocessing necessary to create the node table is simple: first a node fills in the table with all its neighbors and then gets help from neighbors (by requesting their neighbor lists). The analysis of this procedure is identical to the analysis of distributing the tile type map; this preprocessing procedure may take $\theta(k \log k)$ time per node (happening in parallel for each node), for k different tile types. The amount of data sent by each node is limited to $\theta(k \log k)$ packets. For 3-SAT's k=64, that is fewer than 300 packets, which for typical UDP packets amounts to only 15 kilobytes.

After the preprocessing, when queried for the IP address of a node that deploys tile components of a given type, the node may perform two steps: (1) it may select one of the three entries in the node table for that tile type, at random, and (2) it may replace its list of three entries in the table with the selected node's corresponding three entries. The reason for the replacement is to enable the selection of IP addresses to emulate a random walk on the node graph. The request packet only needs to contain the tile type (e.g., a 32-bit number) and the answer packet must contain three IP addresses (three 128-bit numbers). This entire procedure takes $\theta(1)$ time.

In one aspect, a plurality of participating nodes to a problem to be solved may employ a special type of software, such as a software package distributed via a web link, by disk, or by other means, which enables the participating nodes to communicate in the underlying tile architecture mode and to perform the necessary discovery, recruitment, and replication steps in conjunction with other nodes to arrive at a solution.

Figure 8:
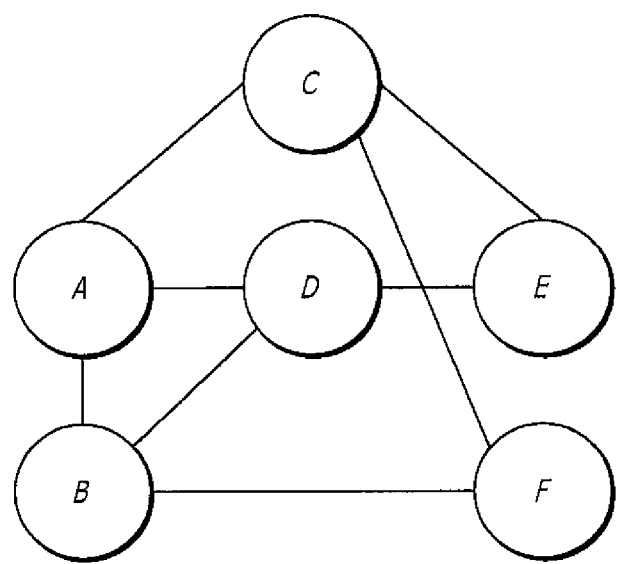
FIG. 8 illustrates a network with six nodes.

FIG. 8 is a conceptual diagram of a network with six nodes that is used to illustrate an example of the preprocessing and discovery process. Suppose the network in FIG. 8 represents the connectivity of six nodes that all map to the same tile type. In creating its node table, node A may first check its neighbors B, C, and D, and record them in the three slots for that tile type. A's node table (for that tile type) may be complete, but had A not found three valid nodes to fill its table, it may expand its neighbor list by querying one of its neighbors for its neighbors, until it discovered a sufficiently large portion of the network. B may follow the same procedure as A and create a node table and records its neighbors A, D, and F as the three nodes deploying the same tile type. When A needs a node of that type later, it may select a random node from its three entries. Suppose it selects B. A may then replace its node table entries with B's entries (A, D, F). It is possible for a node to store itself on its node table.

Accordingly, a random network may be converted into one such that each node has exactly three neighbors. However, it will be appreciated that the above analysis can be applied to nodes having three or more neighbors, and to distributed networks in general.

Figure 13B:
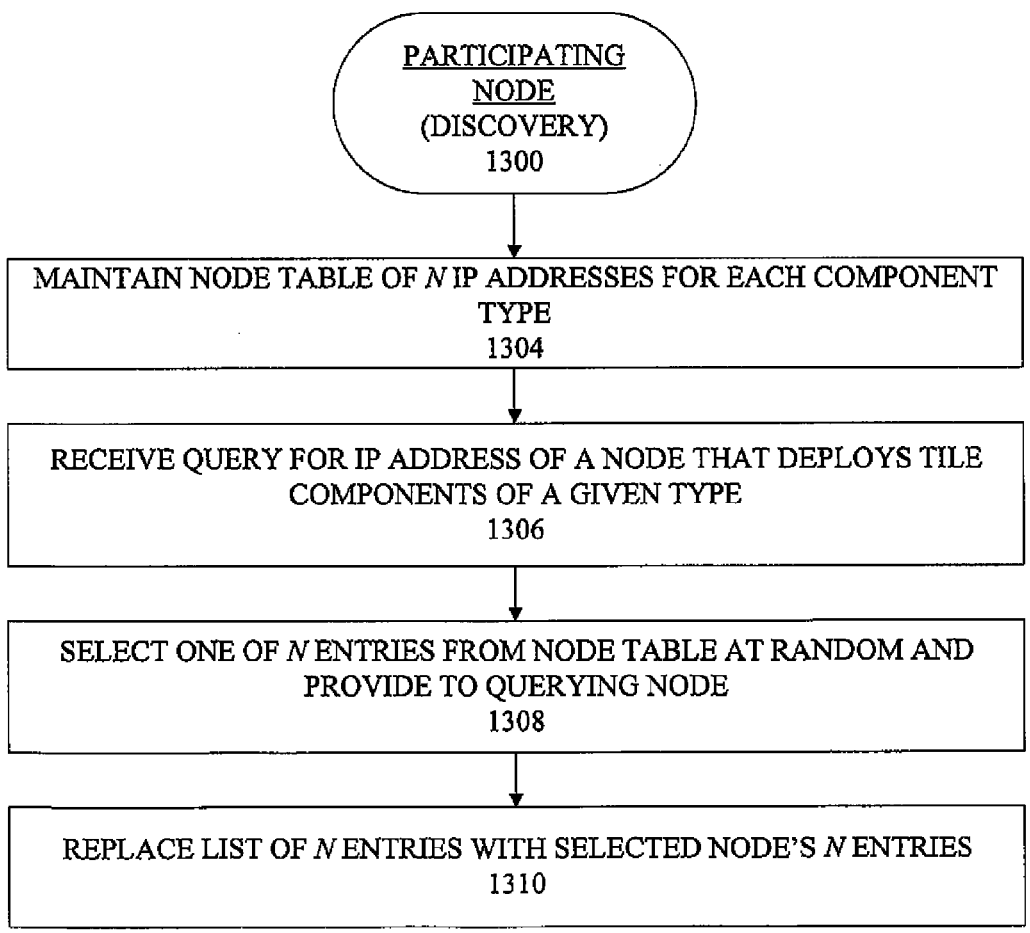
FIG. 13B illustrates a flowchart of an exemplary operation of a participating node using discovery on a network.

FIG. 13B illustrates a flowchart of an exemplary operation of a participating node 1300 using discovery on a network. The node 1300 maintains a node table of N IP addresses (or other node identifiers) for each tile type (1304). During the course of a computation, the node 1300 may receive a query from a querying node for an IP address of some target node that deploys tile components of a given tile type (1306). Node 1300 selects one of the N entries from the node table at random and provides the entry to the querying node (1308). Node 1300 then replaces its list of N entries in the table with the target node's N entries.

706. Recruitment

Figure 9:
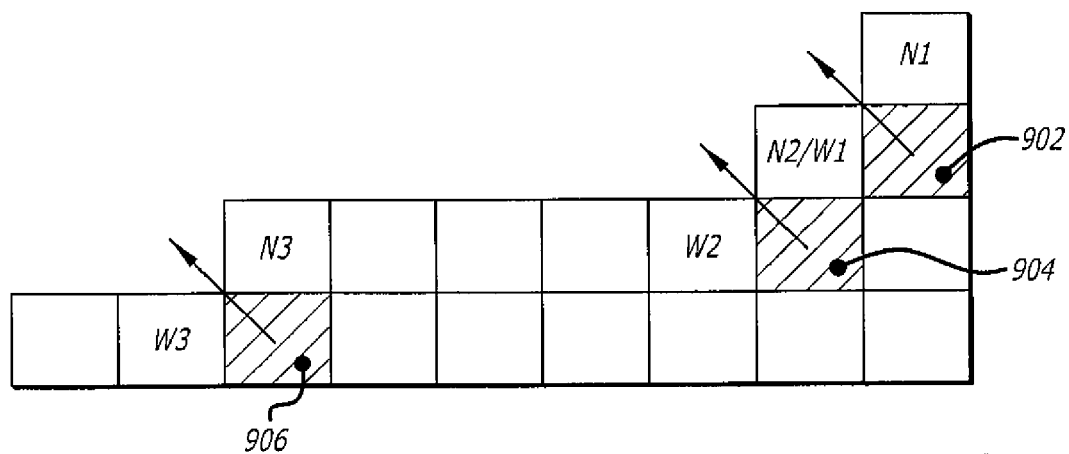
FIG. 9 illustrates an exemplary set of tile components that can be used to recruit new tile components.

The seed crystal grows into a full assembly by recruiting file attachments. In a computational tile assembly (such as the assembly in FIG. 5 that solves 3-SAT), a tile that has both a north and a west neighbor recruits a new tile to attach to its northwest. FIG. 9 indicates three places in a sample crystal 900 where tile components are ready to recruit new tiles. A recruiting tile component X (any of tiles 902, 904 and 906), for each tile type, may pick a potential attachment node Y of that type from its node table as described above, and send that node an attachment request. An attachment request includes X's north neighbor's (N1, N2/W1, or N3, respectively, for nodes 902, 904, and 906) west interface and X's west neighbor's (N2/W1, W2, or W3, respectively) north interface. If those interfaces match Y's east and south interfaces, respectively, then Y can attach. At that point, X informs Y of the IP addresses of its two new neighbors, and those neighbors of Y's IP address. In an aspect, X may perform this operation without ever learning its neighbors' interfaces by using Yao's garbled protocol, which is employed in one embodiment for privacy preservation.

Each component's recruitment can be described as a five-step process: X asks N (its north neighbor) to encode its west domain, N asks W (X's west neighbor) to encode its north domain, W responds to X, X sends attachment requests to a set of potential attachments Y, and those Ys reply to X.

In the example of FIG. 5, the successful crystal recruits 310 tile components (i.e., tiles other than in rows 502 and 504).

In the above examples it is assumed that single tiles are recruited. In other embodiments, groups of tiles may be formed outside of a seed configuration. An instance of this may occur where the temperature of tiles is set to a number other than one, such as two. In this case, groups of tiles with an affinity for one another may form small computations together. Thereupon, tiles from an assembly may recruit an entire group where the group has the properties necessary to attach onto the assembly.

Figure 13C:
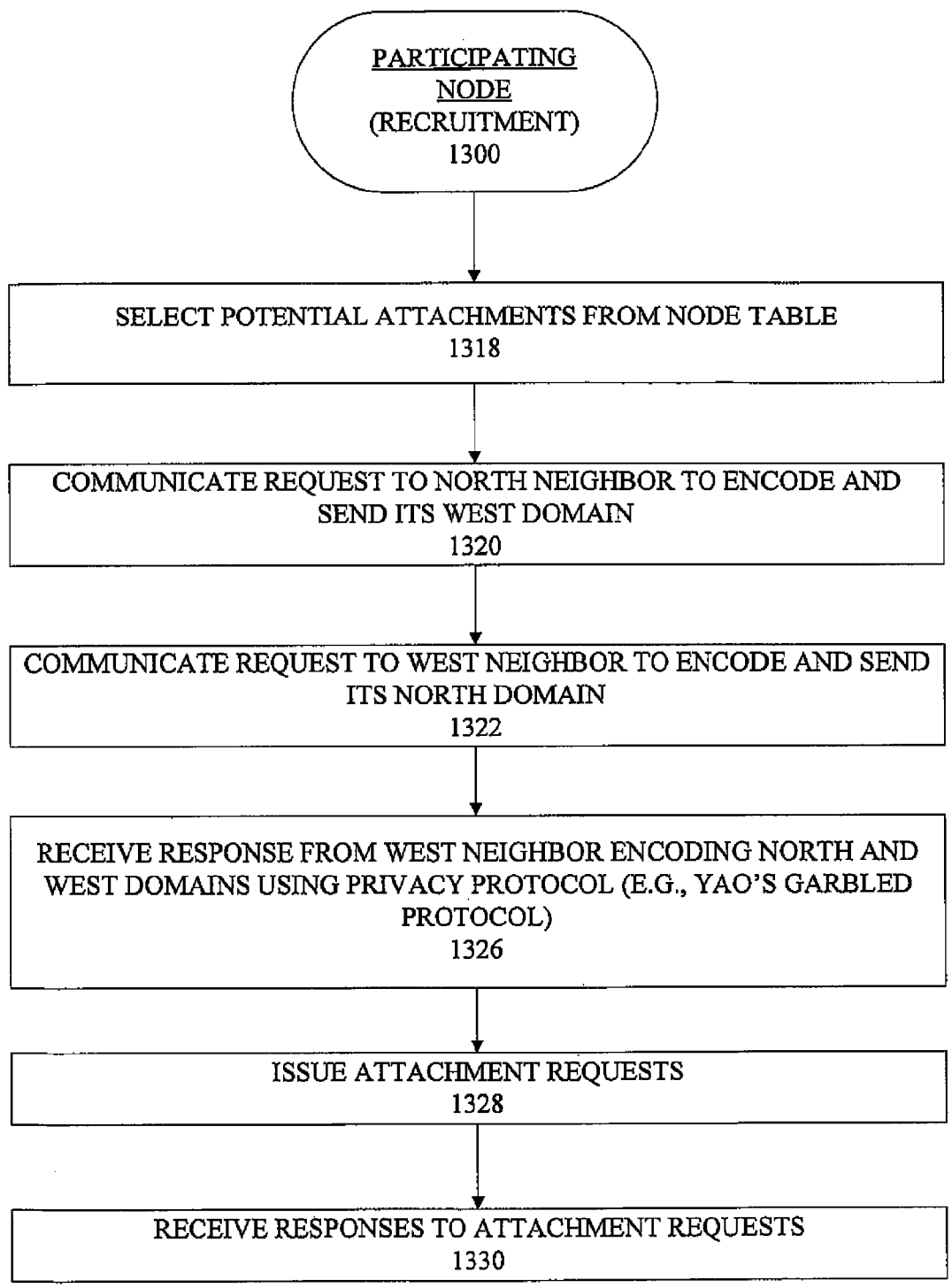
FIG. 13C illustrates a flowchart of an exemplary operation of a participating node using recruitment on a network.

FIG. 13C illustrates a flowchart of an exemplary operation of a participating node 1300 using recruitment on a network. A node seeking to recruit another node to attach a tile to an assembly may select potential attachment tiles from its node table (1318). The recruiting node may communicate a request to its north neighbor to encode its west domain and send to it the encoded domain (in this case, send it from the north neighbor to the west neighbor, who sends it to the recruiting node) (1320). The information may be encoded so that the recruiting node will not learn the content of the its north neighbor's domain, but will be able to pass it on to the potential attachments. The recruiting node may then communicate a similar request to its west neighbor to encode its north domain and send it to the recruiting node (1322).

The recruiting node receives a response from the west neighbor containing both the encoded north and west domains using an appropriate protocol (1326). At this point, the recruiting node may issue one or more attachment requests to the potential attachment nodes (1328). The attachment requests may include the encoded north and west domains and other information. Thereupon, the recruiting node may receive responses to the attachment requests confirming that the attachment attempt was successful and that the tile has grown by an additional tile.

704. Replication

In another aspect, whenever network nodes have extra cycles they are not using for recruitment, they may replicate the seed. Each node X uses its node table, as described above, to find another node Y on the network that deploys the same type components as itself, and sends it a replication request. A replication request may comprise, in one configuration, up to two IP addresses (four 128-bit numbers) of X's neighbors. X may let its neighbors know that Y is X's replica (by sending Y's IP to X's neighbors). Those neighbors, when they replicate using this exact mechanism, may send their replicas' IP addresses to Y. Thus, the entire seed may replicate. Each component's replication can thus be described as a three-step process: X sends a replication request to Y, Y replies to X, and X tells its neighbors about Y.

At the start of the computation, while there are very few recruiting seeds, the replication may create an exponentially growing number of identical seeds (the first seed may replicate to create two, those two will create four, then eight, etc.). When there are sufficiently many seeds to keep the nodes occupied recruiting, replication may slow down because recruitment in these examples has a higher priority than replication. As some seeds complete recruitment and free up nodes' cycles, replication may once again create more seeds.

The seeds may continue to replicate and self-assemble until one of the assemblies finds the solution, at which time the client node may broadcast a signal to cease computation by sending a small "STOP" packet to all its neighbors, and they may forward that packet to their neighbors, and so on.

A crystal that finds the truth assignment that satisfies the Boolean formula may report the success to the client computer. Since for NP-complete problems the answer is always "yes" or "no," the notification is only a few bits. Deciding that there is no satisfying assignment is more difficult. No crystal can claim to have found the proof that no such assignment exists. Rather, the absence of crystals that have found such an assignment stands to provide some certainty that it does not exist. Because for an input on n variables there are $2^n$ possible assignments, if $2^n$ randomly-selected crystals find no suitable assignment, then the client knows there does not exist such an assignment with probability at least $(1-e^{-1})$. After exploring $m \times 2^n$ crystals, the probability grows to at least $(1-e^{-m})$. Thus as time grows linearly, the probability of error diminishes exponentially. Given the network size and bandwidth, it is possible to determine how long one must wait to get the probability of an error arbitrarily low. In the example of 3-SAT with 3 variables, the probability of exploring. $2^3=8$ crystals and not finding the solution is no more than $e^{-1}$. After exploring 80 crystals, that probability drops to $e^{-10}<10^{-4}$. No crystal in the example of FIG. 5 can be larger than 310 tiles, so 80 crystals would require fewer than 25,000 tile components. Because the tile components are lightweight (each one is far smaller than 1 KiB), there is little reason why even a single computer could not deploy that many components.

In some aspects, recruitment may be initiated by nodes corresponding to tiles in the first created tile seed assembly on the network and may continue in a progressive manner by recruited nodes—i.e., recruited nodes may continue to recruit still other nodes and so forth—until a full tile assembly is completed (assuming the problem is solvable and a solution is possible). In like manner, replication may be progressive as nodes that are recruited or that are the subject of replication may further perform replication with respect to other nodes.

Figure 13D:
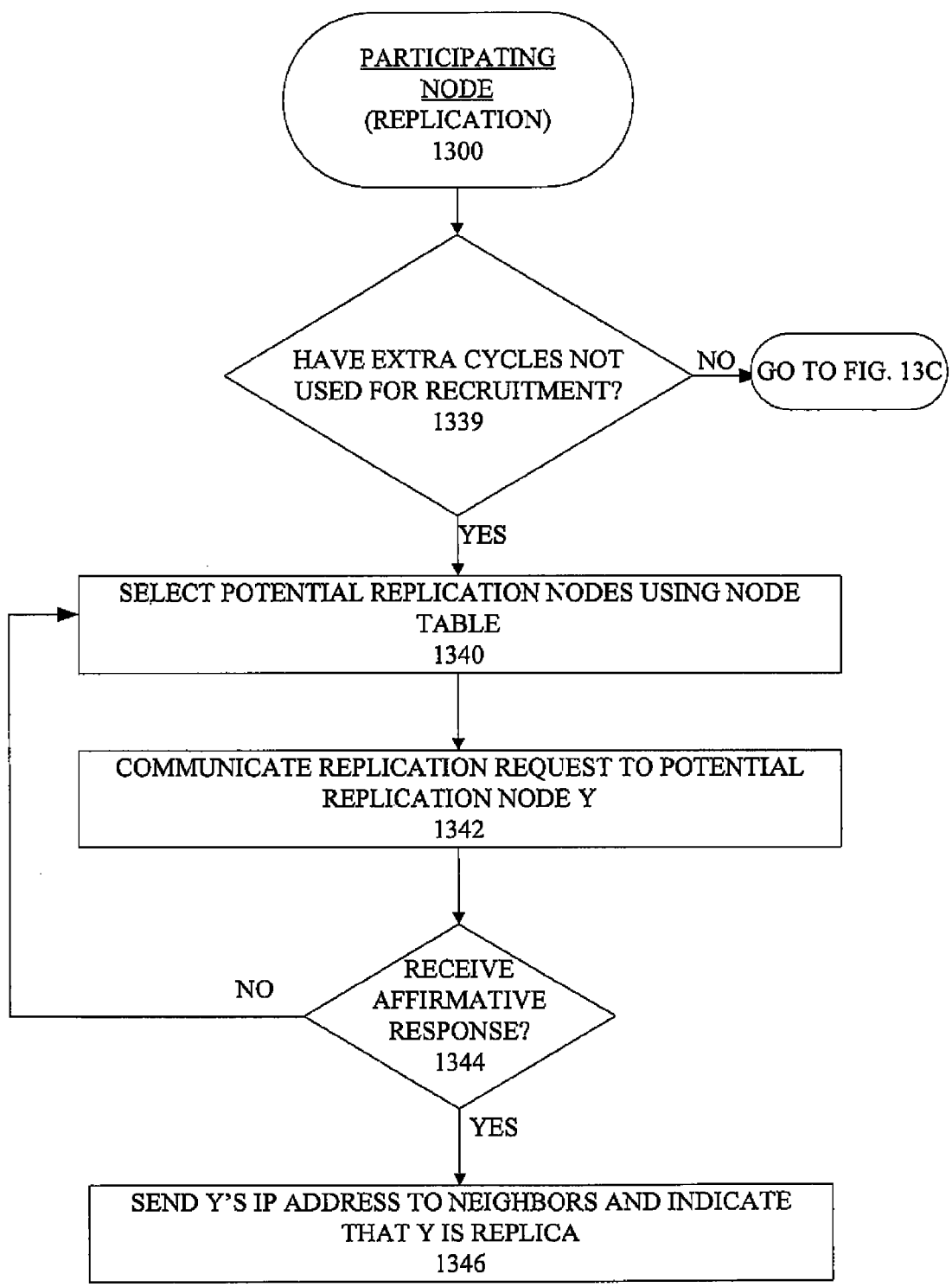
FIG. 13D illustrates a flowchart of an exemplary operation of a participating node using replication on a network.

FIG. 13D illustrates a flowchart of an exemplary operation of a participating node 1300 using replication on a network. It is initially determined whether the computing machine at the node 1300 has additional cycles that may be used for replication that are not being used for recruitment (1339). If so, the replicating node 1300 selects potential replication nodes using its node table (1340). The node 1300 sends replication requests to potential replication nodes including node Y (1342). Upon receiving an affirmative response (1344) from a replication node Y, indicating that the node Y has deployed a tile in replication to the replicating node's tile, the replicating node 1300 thereupon transmits to its neighbors Y's IP address along with an indication that Y is a replica (1346).

Privacy Preservation

The tile style architecture according to the disclosure has the characteristic of preserving privacy because (i) given a single tile in an assembly, it is not possible to learn any information about the input, and (ii) controlling enough computers to learn the entire input is prohibitively difficult on a large network. For a tile assembly, such as the one solving 3-SAT, each tile type encodes no more than one bit of the input. A special tile encodes the solution, but has no knowledge of the input. A single node on the network may deploy several tile components of the same type. However, each component is unaware of its location in the crystal, and thus does not know the location of the bits of the input. Thus, every node on the network may be aware of either some bits of the input or the solution, but not both, and a node cannot use the partial information it has about the bits of the input to recompose that input in its entirety. That is, the nodes may learn information such as "there is at least one 0 bit in the input," but no more.

If an adversary controls or can see the internal data of the entire network, that adversary can learn the input to the problem. However, the likelihood of such a scenario on a very large public network is exceptionally low. For example, it has been shown by the inventors that, where c is the fraction of a network that an adversary has compromised, s is the number of seeds deployed during a computation, and n is the number of bits (tiles) in an input, the probability that the compromised computers contain an entire input seed to a tile-style system is $1-(1-c^n)^s$.

As an illustration, a tile-style system is deployed on a network of $2^{20}$ 1,000,000 machines to solve a 38-variable 100-clause 3-SAT problem. A powerful adversary has gained control of 12.5% of that network. In order to solve this problem, the system may need to deploy no more than $2^{38}$ seeds, thus the adversary will be able to reconstruct the seed with probability $1-(1-2^{-114})^{2^{38}} < 10^{-22}$. As the input size increases, this probability further decreases. The probability decays exponentially for all $c < \frac{1}{2}$ (that is, as long as the adversary controls less than one half of the network). In the above example, control of 25% of the network gives the adversary a probability of reconstructing the input below $10^{-11}$, and control of 33% of the network yields a probability no greater than $10^{-6}$. An adversary who controls exactly half the network has a 37% chance of learning the input, and one who controls more than half the network is likely to be able to learn the input. Thus, in one embodiment where privacy preservation is of paramount importance, the network used for the computation comprises a large public network.

One possible challenge to privacy preservation on large public networks is botnets. However, no single botnet comes even close to controlling a significant fraction, (say, more than $\frac{1}{1000}$) of the Internet. As the Internet grows, for any fixed-size botnet, the probability that botnet can affect a tile style system drops exponentially.

The same analysis and exponential probability drop off regarding the number of nodes necessary to compromise the entire input may apply to reconstructing fractional parts (e.g., one half or one third) of the input. It is somewhat simpler to reconstruct small fragments of the input (e.g., two- or three-bit pieces), but the information contained in those fragments is greatly limited, can be minimized by using efficient encodings of the data, and for such small fragments, cannot be used to reconstruct larger fragments.

Each tile component in the 3-SAT system may handle at most a single bit of the input. Theoretically, this is sufficient for solving NP-complete problems; however, practically, handling more than a single bit of data at a time would amortize some of the overhead. Thus, in another embodiment, each tile component can be made to represent several bits. This transformation would result in a trade-off between privacy preservation and efficiency, as faster computation would reveal larger segments of the input to each node.

Efficiency and Scalability

The tile style may be implemented efficiently enough to solve computationally intensive problems in a practical manner. At first glance, tile style's heavy use of the network may appear to make it less efficient than even a single computer. This intuition, however, is misleading. With respect to a single node in an executing tile-style system according to one aspect, it may constantly perform computation: as soon as a node finishes replicating or recruiting with regard to a single tile, it may move on to the next tile. Thus, while there is some overhead to sending network messages, no node ever need idly wait for the messages to arrive, but rather may makes itself busy with other relevant computations. Because the problems the tile style targets are precisely the computationally intensive problems whose algorithms have a large number (exponential in the size of the input) of independent parallel threads, the nodes do not run out of subcomputations waiting to be executed. Since every node is constantly performing computation and never waiting for the communication, a network may perform faster than a single computer by a factor that is proportional to the size of the network and inversely proportional to the overhead of the tile style.

There are three ways to solve a highly parallelizable problem while preserving the data privacy: (1) on a large insecure network by using the tile style, (2) on a single private computer, or (3) on a small private network of trustworthy computers.

In one illustration, a network with N nodes uses the tile style to solve an n-variable m-clause 3-SAT problem. In expectation, the system has to explore $2^n$, crystals to reach a solution, and each crystal contains $(3m+n) \lg n$ replicated tiles (clear tiles in FIG. 5) and no more than $3nm \lg^2 n$ recruited tiles (non-clear tiles in FIG. 5). On average, each node will need to replicate $$\frac{(3m+n) \lg n}{N} 2^n$$

tiles and recruit $$\frac{3nm \lg^2 n}{N} 2^n$$

tiles. The replication procedure in one embodiment comprises three operations (X sending a replication request to Y, Y replying to the request, and X telling each of its neighbors about Y), each operation concluded by sending a single network packet; the time for these operations is denoted as 3i.

Similarly, the recruitment procedure in one embodiment comprises five operations (X asks N to encode its west domain, N asks W to encode its north domain, W responds to X, X sends attachment requests to a set of potential attachments Y, and those Ys reply to X), each operation also concluded by sending a single network packet; the time for these operations is denoted as 5u. Thus, the time required by each node is summarized by Equation (1). This analysis is specific to the 3-SAT embodiment, but the running times for other NP-complete problems may be substantially similar, since the fastest growing factor of $2^n$ will be the same.

$$\left(3i\frac{(3m+n)lgn}{N} + 5u\frac{3nmlg^2n}{N}\right)2^n \quad (1)$$

$$2^n(n+3m)r \quad (2)$$

If a user wishes to solve the 3-SAT instance on a single computer, that computer may need to examine $2^n$ possible assignments, and check each n-variable assignment against the m clauses. Equation (2) describes the time this procedure would take using the most efficient available technique, assuming r is the amount of time each operation takes to execute: for each assignment, a hash set is created containing the n literal-selection elements and each of the 3m literals is checked for whether or not the hash set contains that literal. The overhead of using the tile style over a single computer in this example is the ratio of (1) and (2). Assuming m>n and i=u=r, meaning that it takes roughly the same amount of time to perform each operation (e.g., looking up a value in a hash set and releasing a message on the network), the ratio is no greater than $$\frac{8nlg^2n}{N}.$$

In other words, if the size of the public network exceeds $8nlg^2n$, the tile style executes faster than a single machine. For the sizes of problems in the physical configuration discussed below, that network size is several thousand nodes. In some embodiments, since the speed up on a tile-style system is linear in the size of the network, solving such a problem on a several-million-node network may execute 1000 times faster than a single-computer solution.

Another illustrative case includes a situation where a user wishes to solve the 3-SAT instance on a private network of M computers. Assuming the best possible distribution of computation and that the network communication is non-blocking, the time this system would require to solve the problem is no less than $$\frac{2^n(n+3m)r}{M}.$$

In this case, the overhead of using the tile style over a private network is $$\frac{8nlg^2nM}{N}.$$

In other words, if the size of the public network exceeds $8nlg^2nM$, the tile style will execute faster than the private network.

Physical Implementation of Tile Style for Distributed Computing

The inventors have implemented Mahjong, a Java-based distributed software system adopting an embodiment of the tile architectural style. Prism-MW, a middleware platform intended specifically for style-driven implementation of software architectures in highly-distributed and resource—constrained environments, was used in this embodiment. Mahjong may be found at the URL http://csse.usc.edu/~ybrun/Mahjong/ and is hereby incorporated by reference as if fully set forth herein. Mahjong takes a user-provided description of a set of tiles for an NP-complete problem and the input to the computation (the tiles for solving two NP-complete problems, SubsetSum and 3-SAT, are included) and automates the remaining steps of building a distributed tile-style system.

The inventors performed a number of empirical measurements of Mahjong in solving SubsetSum and 3-SAT problems on dedicated networks as large as 186 nodes. These evaluations demonstrate that tile-style systems do in fact solve NP-complete problems, show the speed up trends on growing networks, and measure execution-time constants.

To verify the correctness of the tile-style algorithms, several SubsetSum and 3-SAT problems (up to 32 bits in size), were solved. The sizes of instances were chosen to each execute in under 4 hours on a 186-node network. Mahjong found the correct solution to each instance and sent no unexpected communication between nodes. No node produced undesired connections between tiles. Further, inputs that returned a negative answer were tested on Mahjong. As expected, it executed indefinitely.

In a series of experiments varying the size of the underlying network up to 186 nodes, it was determined that doubling the size of the network consistently decreased the computation time by a factor of 1.9. The slight inefficiency may comes from the constant underlying-network bandwidth and the increased load. By contrast, increasing the size of a global network may add communication pathways and increase overall bandwidth. The results provide confirmation that the speed of a tile-style system is proportional to the size of the network. This provides a desirable scaling trend for large networks.

We measured the constants r, i, and u on a computer with a 2.4 GHz processor running Windows XP and Sun JDK 6.0 by executing several million benchmark tests and averaging their running times. We found that r≈3.6×10$^{-7}$ seconds (≈2.8 MHz), l≈2.8×10$^{-7}$ seconds (≈3.8 MHz), and u≈4.1×10$^{-7}$ seconds (2.4 MHz). With these measurements and Equations (1) and (2), the speeds of a tile-style system and a single computer solving a given NP-complete problem may be estimated. For example, solving a 38-variable, 100-clause instance on a single computer would take 3.3×10$^7$ seconds≈1 year. However, the same problem could be solved using the tile style on a million-node network in 1.8×10$^5$ seconds≈2.1 days.

Figure 10:
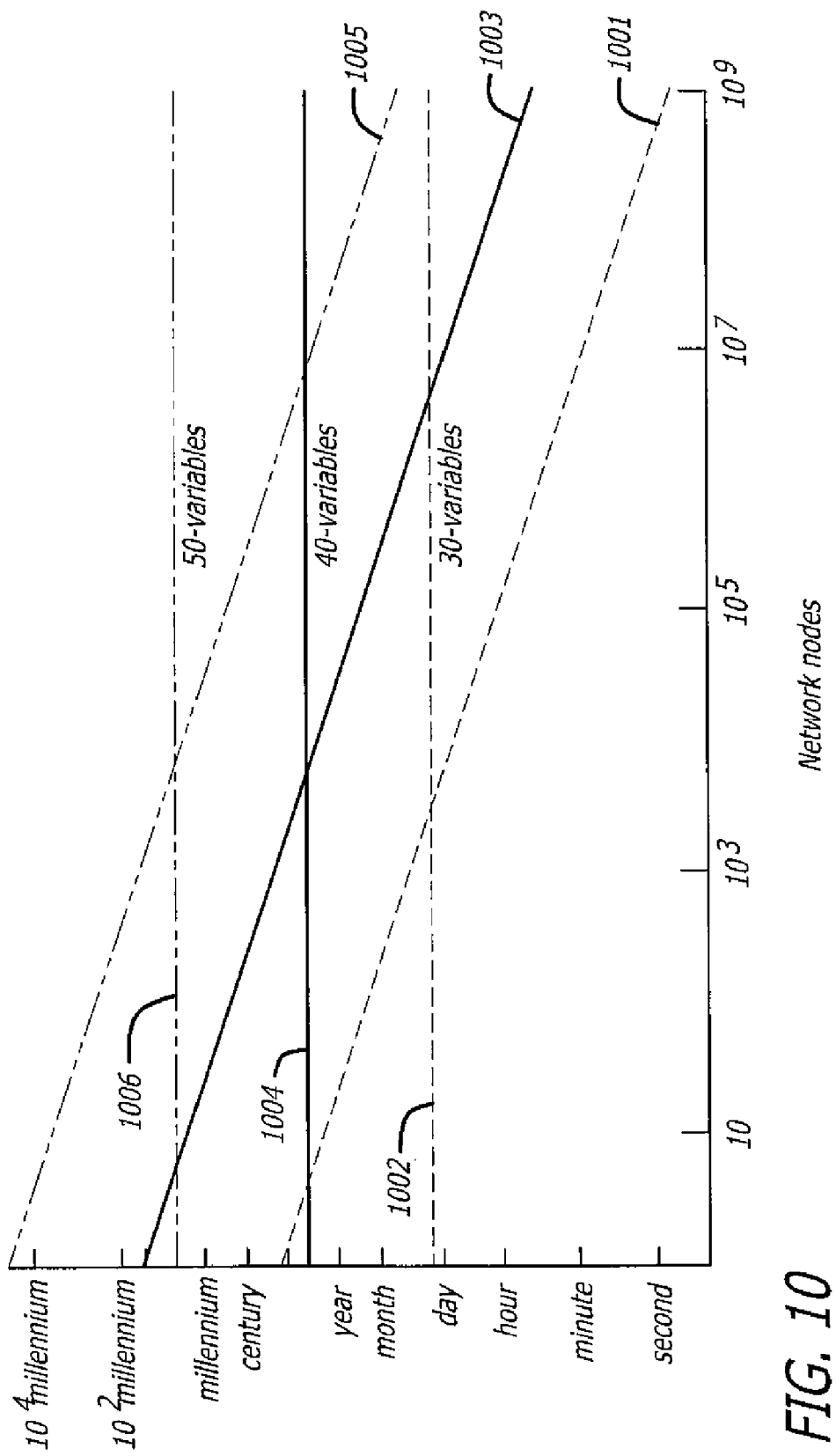
FIG. 10 illustrates a graph showing expected running times for single computer and tile-style solutions for 30-, 40-, and 50-variable, 100-clause 3-SAT problems on varying size networks.

FIG. 10 illustrates a graph showing expected running times for single computer and tile-style solutions for 30-, 40-, and 50-variable, 100-clause 3-SAT problems on varying size networks. For each of the three depicted 100-clause 3-SAT instances (with 30, 40, and 50 variables), the graph shows the horizontal line (1002, 1004, and 1006, respectively) indicating the running time of a single-computer solution, and the diagonal line (1001, 1003, and 1005, respectively) indicating the running time of a tile-style system implemented in Mahjong and deployed on networks of varying sizes. For networks larger than about 4000 nodes, the tile-style solutions outperform their competitors; for extremely large networks the tile systems are much faster. For example, solving the 40-variable, 100-clause 3-SAT problem on a single computer would take 4 years, while doing so using the tile style solution implemented in Mahjong and deployed on the network the size of SETI@home (18 million nodes) would take 7 days.

Detailed descriptions of efficient tile assemblies that solve NP-complete problems 3-SAT and SubsetSum have been provided. Using these assemblies, we have described how to build distributed software systems using the tile style to solve NP problems. There exist other classes of problems that can be solved using tile assemblies, and thus these problems can be solved using distributed systems built based on the tile style. In fact, Winfree has shown that tile assemblies are Turing universal, which means that all computable problems can be solved using tile assemblies. While his statement is powerful, his demonstration creates large and inefficient tile assemblies that would result in bulky and slow tile-style distributed systems if our methodology were applied to his assemblies. Thus the creation of efficient and small assemblies that solve NP-complete problems, such as the ones we have described above, allows the creation of more efficient and faster software systems. However, it is of note that the tile style can be used to solve other computable problems, in particular PSPACE and PSPACE-complete problems, by using either Winfree's inefficient tile assemblies, or developing more efficient and smaller tile assemblies that solve such problems.

Each one or more computers at the client node may comprise a processor or a processing system. In general, the processing system may be implemented using hardware, software, or a combination of both. By way of example, a processing system may be implemented with one or more integrated circuits (IC). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the general purpose processor may be any conventional processor, controller, microcontroller, or state machine. A processing system may also be implemented as a combination of computing devices, e.g., a combination of a DSP and a microprocessor, a plurality of microprocessors, one or more microprocessors in conjunction with a DSP core, or any other such configuration.

A memory unit ("memory") may be coupled to the processing unit (see FIG. 11). The memory unit may include RAM, ROM, flash memory, or any known type of memory module or integrated circuit in whatever form. Alternatively or additionally, the memory unit may include storage include one or more hard drives, optical drives, tape drives, or other storage. The memory may collectively hold and store information for use by the processing unit as described in this disclosure, including for example, computer programs, learned acoustic signatures, and the like.

The term "computing system" as described herein may refer to a single computing machine or to multiple computing machines, coupled together through a hardwired connection, through a network, or otherwise.

The code or instructions may be embodied in one or more machine-readable media to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system. Moreover, in some aspects any suitable computer-program product may comprise a computer-readable medium or machine-readable medium comprising codes relating to one or more of the aspects of the disclosure. In some aspects a computer program product may comprise packaging materials.

The various components that have been discussed may be made from combinations of hardware and/or software, including operating systems and software application programs that are configured to implement the various functions that have been ascribed to these components above and in the claims below. The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

We claim:

1. A method for solving a computational problem by distributing the computation needed to solve the problem across a plurality of participating nodes in a network using a tile-style architecture, comprising:

determining an expression for a tile seed assembly for said computation, the tile seed assembly containing multiple tiles, each tile being a multi-dimensional object with a value for each dimension that encodes a rule that is part of the computation;

identifying a plurality of tile types;

assigning at least one tile type to each node of said plurality of nodes;

communicating, to each node, information comprising said at least one tile type assigned to said node; and establishing an executable instance of said tile seed assembly on selected nodes of said plurality of nodes,
wherein said assigning and communicating further comprise:
determining a plurality of sets of node identifiers, said node identifiers each used to identify possible nodes in said network, said possible nodes comprising said participating nodes;
associating at least one different tile type to each set;
generating a tile type map comprising said associations; and
communicating said map to each said participating node.

2. The method of claim 1 wherein said problem comprises one of an NP-complete problem and an NP problem.

3. The method of claim 1 wherein said problem comprises a PSPACE-complete problem.

4. The method of claim 1 wherein said establishing said executable instance of said tile seed assembly comprises: identifying, for each tile in said tile seed assembly, a corresponding node among said plurality of nodes that uses a same tile type as said tile; identifying a set of neighbors of each said corresponding node; and communicating, to each said corresponding node, a request to deploy a tile, and the identity of said set of neighbors of said corresponding node.

5. The method of claim 1 further comprising progressively recruiting tiles from other nodes from among said plurality of participating nodes until, in response to said problem being solvable, a completed tile assembly is thereby formed, wherein said progressively recruiting is initiated by one or more said selected nodes.

6. The method of claim 5, wherein said progressively recruiting tiles comprises recruiting a group of two or more tiles arranged in an assembly that is separate from said established executable instance of said tile seed assembly.

7. The method of claim 5 further comprising progressively replicating tiles from still other nodes from among said plurality of nodes to form one or more additional tile seed assemblies in said network, wherein said progressively replicating is initiated by one or more said selected nodes.

8. The method of claim 1 further comprising receiving a value comprising an output to a tile assembly formed as a result of said tile seed assembly.

9. A computer-program product for distributing a computation needed to solve a problem across a plurality of participating nodes in a network using a tile-style architecture comprising: a non-transitory machine-readable medium comprising instructions executable by a processing system to:
identify a plurality of tile types, each tile being a multi-dimensional object with a value for each dimension that encodes a rule that is part of the computation;
assign at least one tile type to each node;
communicate, to each node, information comprising said at least one tile type assigned to said node; and
establish an executable instance of a tile seed assembly on selected nodes of said plurality, said tile seed assembly comprising encoded inputs to said computation,
wherein said assign and communicate further comprise:
determining a plurality of sets of node identifiers, said node identifiers each used to identify possible nodes in said network, said possible nodes comprising said participating nodes;
associating at least one different tile type to each set;
generating a tile type map comprising said associations; and
communicating said map to each said participating node.

10. The non-transitory computer-program product of claim 9 wherein said problem comprises one of an NP-complete problem and an NP problem.

11. The non-transitory computer-program product of claim 9 wherein said problem comprises a PSPACE-complete problem.

12. The non-transitory computer-program product of claim 9 wherein said instructions are further executable to progressively recruit tiles from other nodes from among said plurality of participating nodes until, in response to said problem being solvable, a completed tile assembly is thereby formed, wherein said progressively recruiting is initiated by one or more said selected nodes.

13. A method for solving a distributed computational problem characterized by a tile seed assembly containing multiple tiles, each tile being a multi-dimensional object with a value for each dimension selected from a finite alphabet, and each tile encoding a rule that is part of the computation, using a tile style architecture, wherein said tile seed assembly is operative to grow into a full tile assembly in response to said problem being solvable, the method comprising:
receiving, by a first node from a second node in a network of nodes, information comprising an assignment by a client node of a tile type to at least said first node and a third node, and a description of said tile type;
receiving, by said first node from said second node, a request to deploy a tile of said same tile type as an attachment of said tile seed assembly;
deploying, by said first node, said tile; and
sending, by said first node to a third node in said network of nodes, a request to deploy another tile of said same tile type,
whereby each tile does not change during the solving of the distributed computational problem.

14. The method of claim 13 wherein said information comprising an assignment further comprises a mapping of different tile types characterizing said distributed problem to different sets of node identifiers, said node identifiers being used to address unique nodes in said network.

15. The method of claim 13 wherein said sending a request comprises using Yao's garbled protocol.

16. The method of claim 13 wherein said problem comprises one of an NP-complete problem and an NP problem.

17. The method of claim 13 wherein said problem comprises a PSPACE-complete problem.

18. The method of claim 13 wherein said sending said request by said first node to said third node to deploy another tile further comprises: sending a message by said first node to a fourth node, said fourth node comprising a north neighbor of said first node, said message comprising a request to encode a west domain of said north neighbor; sending a message by said first node to a fifth node, said fifth node comprising a west neighbor of said first node, said message comprising a request to encode a north domain of said west neighbor; receiving, by said first node from said fifth node in response to said requests, information comprising encoded north and west domains; sending, by said first node to one or more candidate attachment nodes comprising said same tile type, a message comprising a request to deploy a tile, said request to deploy a tile comprising said encoded north and west domains.

19. The method of claim 18 wherein said one or more candidate attachment nodes comprise nodes having east and south domains that match, respectively, said west domain of said north neighbor and said north domain of said west neighbor.

20. The method of claim 13, wherein said tile seed assembly comprises a 3-SAT tile assembly.

21. A non-transitory computer-program product for solving a distributed computational problem characterized by a tile seed assembly containing multiple tiles, each tile being a multi-dimensional object with a value for each dimension selected from a finite alphabet, and each tile encoding a rule that is part of the computation using a tile style architecture, wherein said tile seed assembly is operative to grow into a full tile assembly in response to said problem being solvable, comprising: a machine-readable medium comprising instructions executable by a processing system to:
receive, by a first node from a second node in a network of nodes, information comprising an assignment by a client node of a tile type to at least said first node and a third node, and a description of said tile type;
receive, by said first node from said second node, a request to deploy a tile of said same tile type as a tile in said tile seed assembly; deploy, by said first node, said tile; and
send, by said first node to a third node in said network of nodes, a request to deploy another tile of said same tile type,
whereby each tile does not change during the solving of the distributed computational problem.

22. The non-transitory computer-program product of claim 21 wherein said information comprising an assignment further comprises a mapping of different tile types characterizing said distributed problem to different sets of node identifiers, said node identifiers being used to address unique nodes in said network.

23. The non-transitory computer-program product of claim 21 wherein said sending a request comprises using Yao's garbled protocol.

24. The non-transitory computer-program product of claim 21 wherein said problem comprises one of an NP-complete problem and an NP problem.

25. The non-transitory computer-program product of claim 21 wherein said problem comprises a PSPACE-complete problem.

26. The non-transitory computer-program product of claim 21 wherein said sending said request by said first node to said third node to deploy another tile further comprises: sending a message by said first node to a fourth node, said fourth node comprising a north neighbor of said first node, said message comprising a request to encode a west domain of said north neighbor; sending a message by said first node to a fifth node, said fifth node comprising a west neighbor of said first node, said message comprising a request to encode a north domain of said west neighbor; receiving, by said first node from said fifth node in response to said requests, information comprising encoded north and west domains; sending, by said first node to one or more candidate attachment nodes comprising said same tile type, a message comprising a request to deploy a tile, said request to deploy a tile comprising said encoded north and west domains.

27. The non-transitory computer-program product of claim 26 wherein said one or more candidate attachment nodes comprise nodes having east and south domains that match, respectively, said west domain of said north neighbor and said north domain of said west neighbor.

28. The non-transitory computer-program product of claim 21 wherein said tile seed assembly comprises a 3-SAT tile assembly.

29. A system for solving a computational problem by distributing the computation needed to solve the problem across a plurality of participating nodes in a network using a tile-style architecture, comprising: a computer system comprising:
a processing system configured to:
identify a plurality of tile types, each tile being a multi-dimensional object with a value for each dimension that encodes a rule that is part of the computation;
assign at least one tile type to each said participating node;
communicate, to at least one of said participating nodes for each identified tile type, information comprising said at least one tile type assigned to said node;
establish, based on said assigned tile types, a tile seed assembly on selected nodes of said plurality, said tile seed assembly comprising multiple tiles and encoded inputs to said computation,
wherein said assign and communicate further comprise:
determining a plurality of sets of node identifiers, said node identifiers each used to identify possible nodes in said network, said possible nodes comprising said participating nodes;
associating at least one different tile type to each set;
generating a tile type map comprising said associations; and
communicating said map to each said participating node; and
a plurality of computing machines located respectively at each of said plurality of participating nodes, each computing machine comprising a processing system configured to:
receive said assigned at least one tile type and a description of said tile type;
receive a request to deploy a tile of said assigned tile type; deploy said tile; and
send to other participating nodes a request to deploy another tile of said same tile type.

30. The system of claim 29 wherein said request is received from one of said computer system and another said computing machine.

31. The system of claim 29 wherein said sending a request to deploy another tile comprises a request to recruit another tile.

32. The system of claim 29 wherein said sending a request to deploy another tile comprises a part of a request to replicate said tile seed assembly on other nodes among said plurality of nodes.

* * * * *